INVENTOR:
ALEX TOTH
BY Mason, Kolehmainen
Rathburn & Wyss
ATTORNEYS

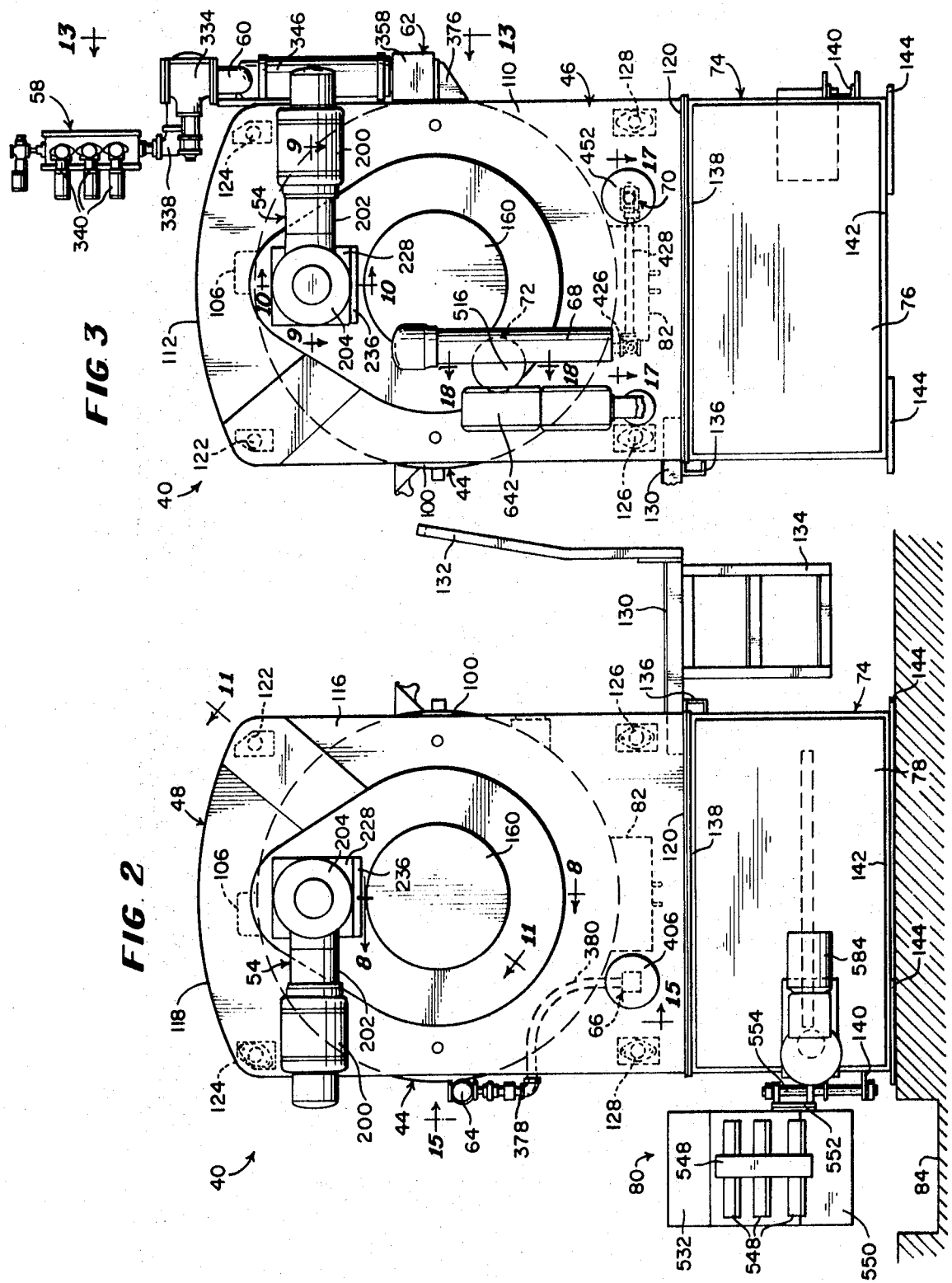

Oct. 19, 1971  A. TOTH  3,613,406
COMMERCIAL LAUNDRY MACHINE
Filed March 25, 1970  11 Sheets-Sheet 3

INVENTOR:
ALEX TOTH
BY Mason, Kolehmainen
Rathburn & Wyss
ATTORNEYS

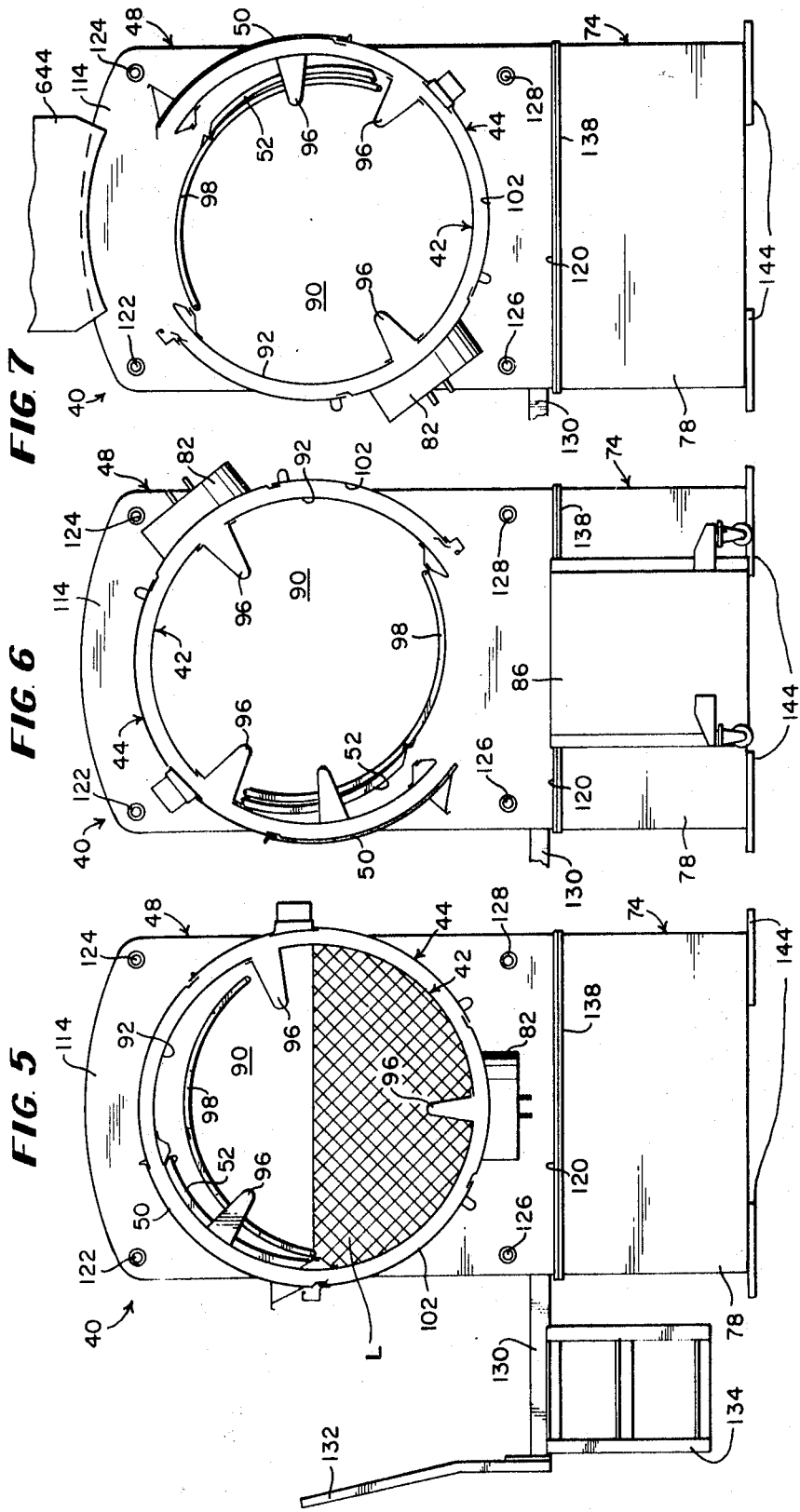

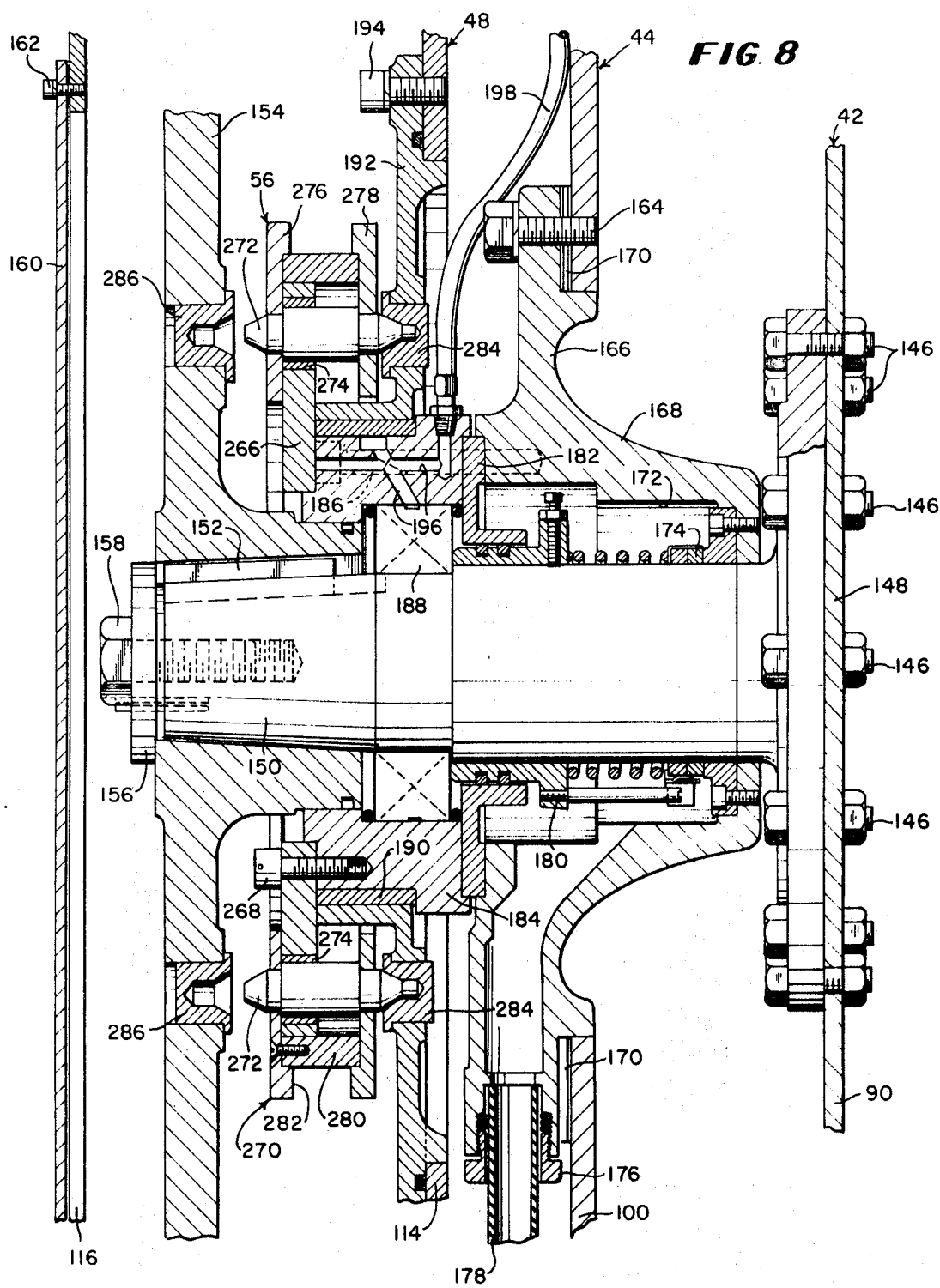

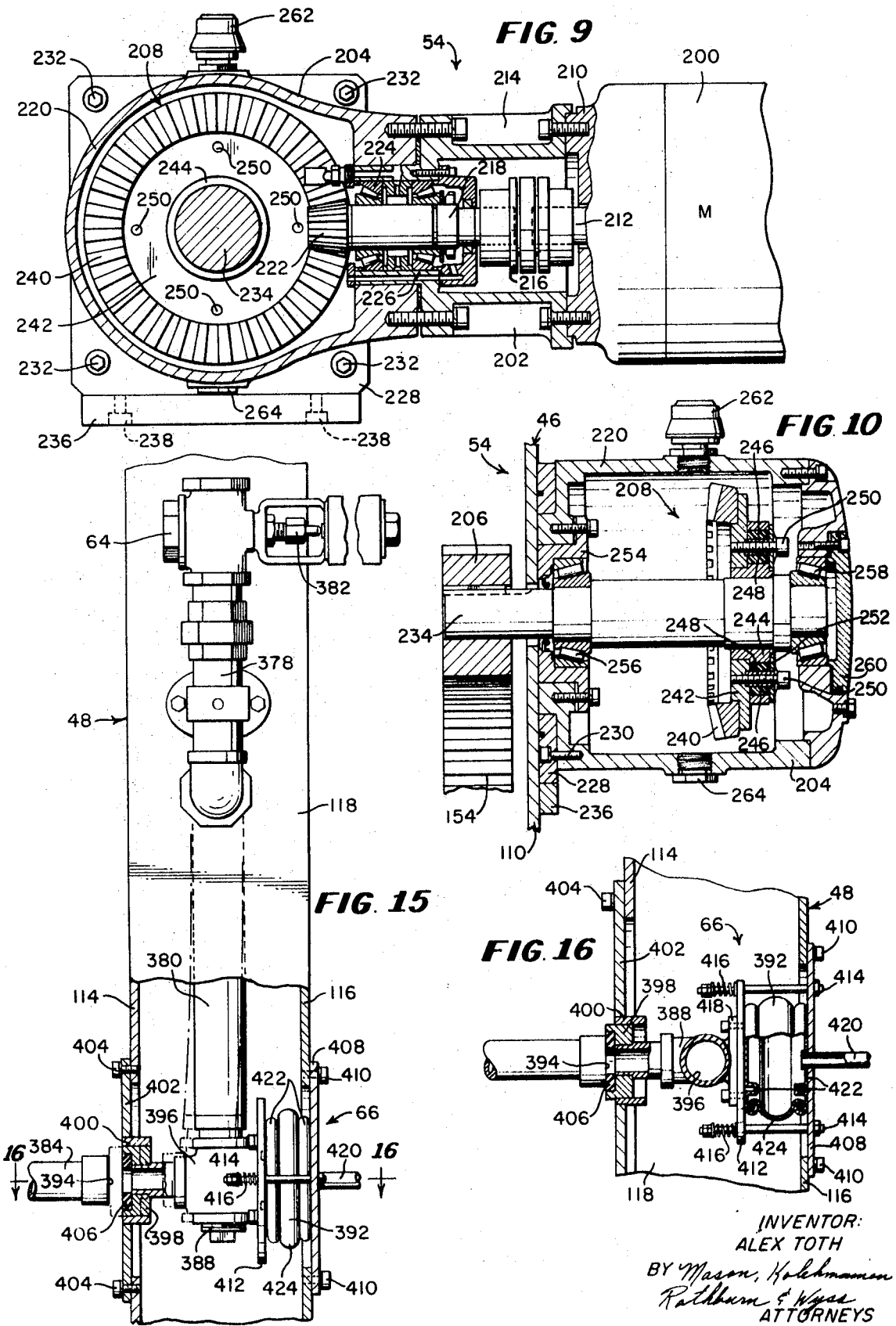

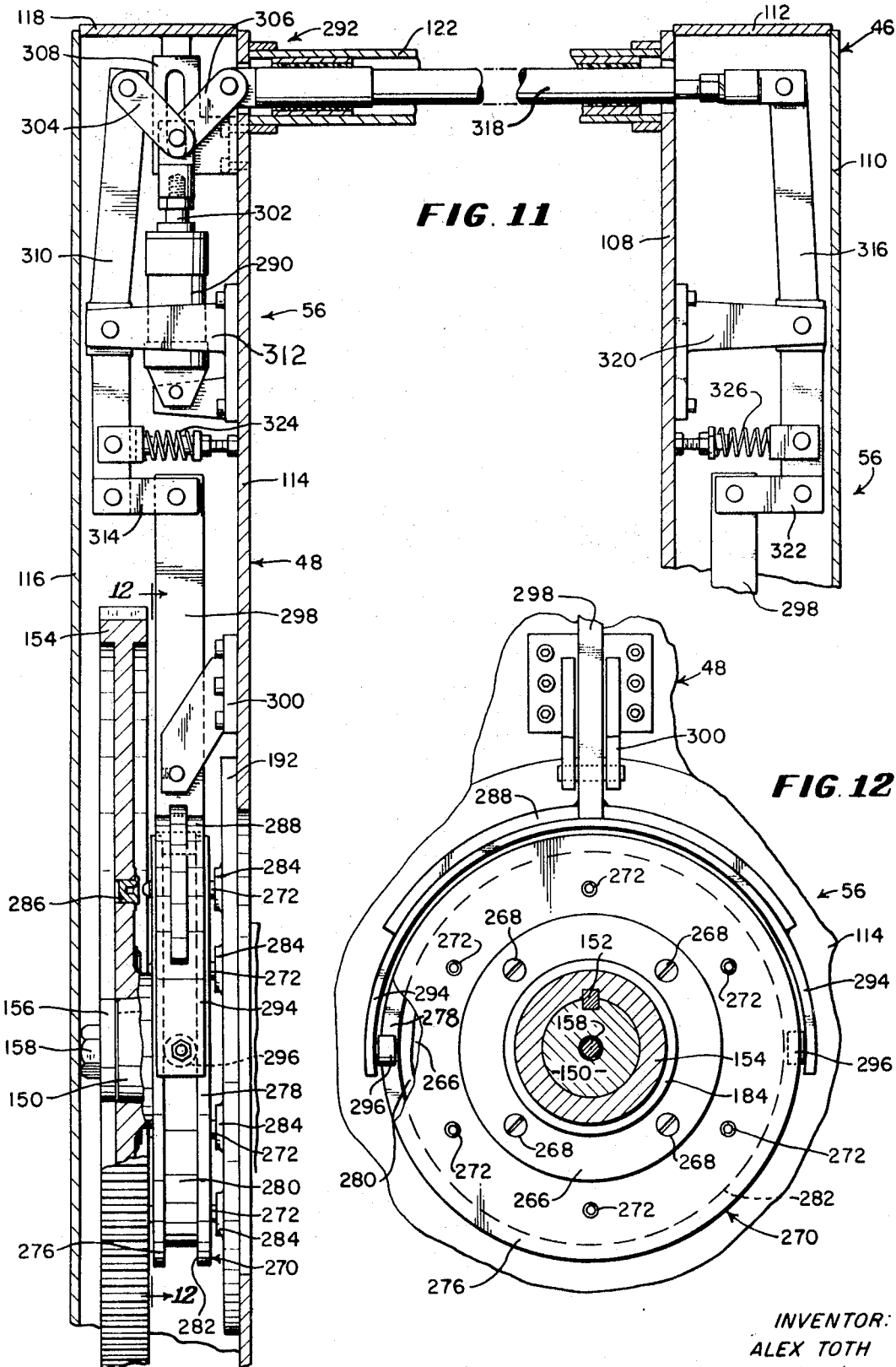

Oct. 19, 1971     A. TOTH     3,613,406
COMMERCIAL LAUNDRY MACHINE
Filed March 25, 1970     11 Sheets-Sheet 8
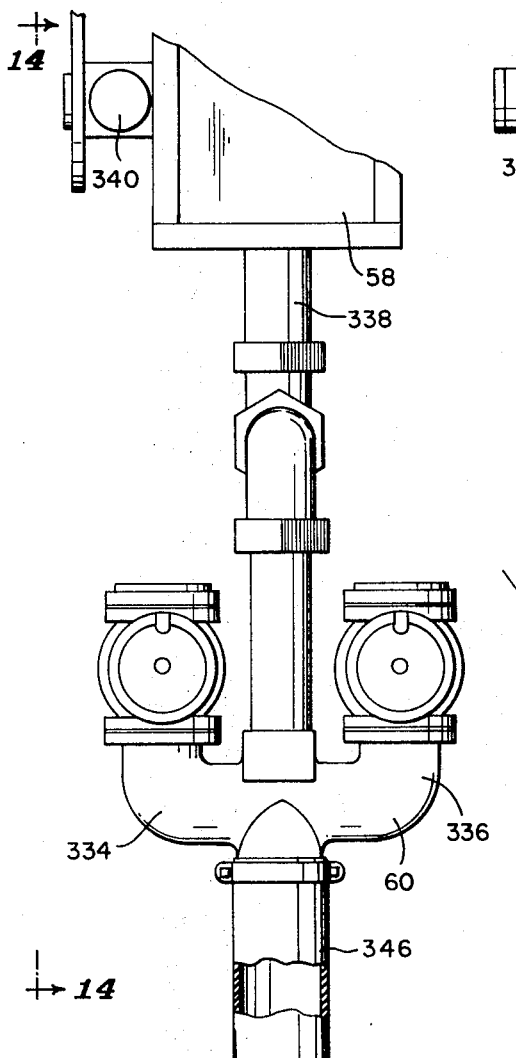
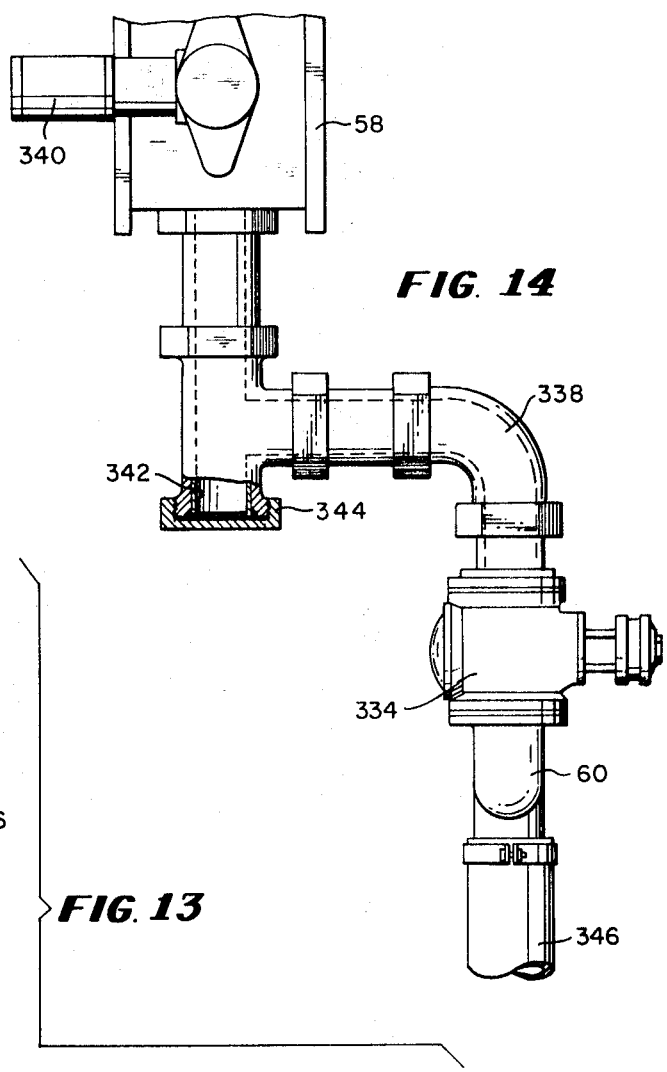
FIG. 14
FIG. 13
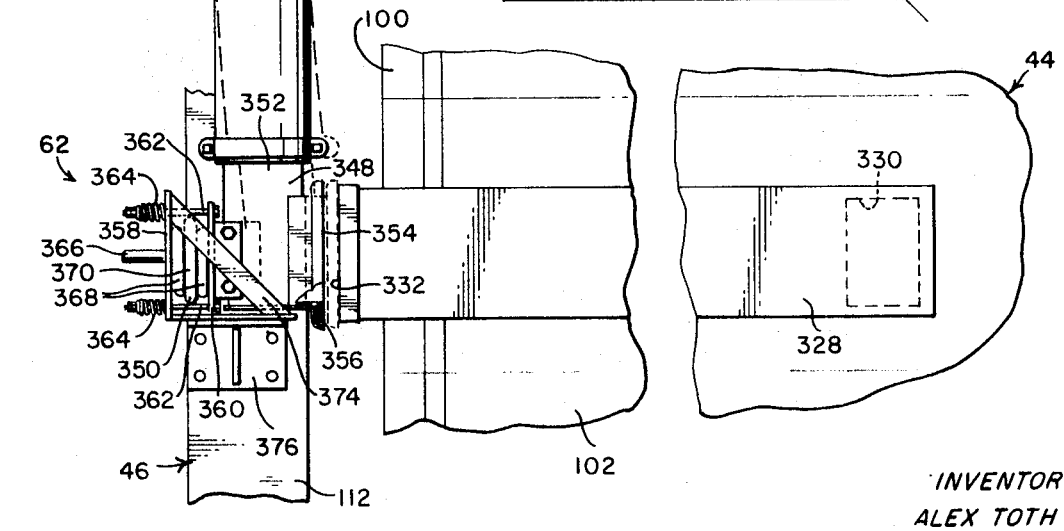
INVENTOR:
ALEX TOTH
BY
ATTORNEYS Oct. 19, 1971   A. TOTH   3,613,406
COMMERCIAL LAUNDRY MACHINE
Filed March 25, 1970   11 Sheets-Sheet 9
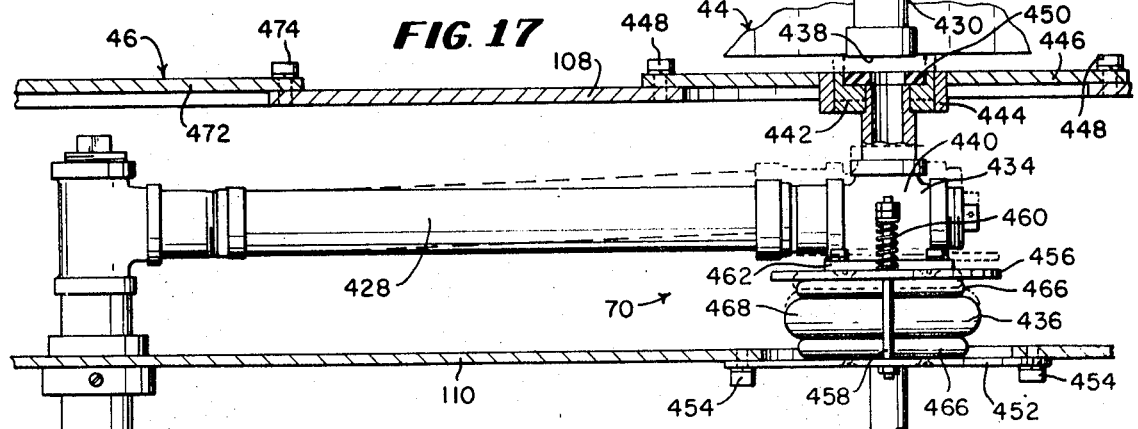
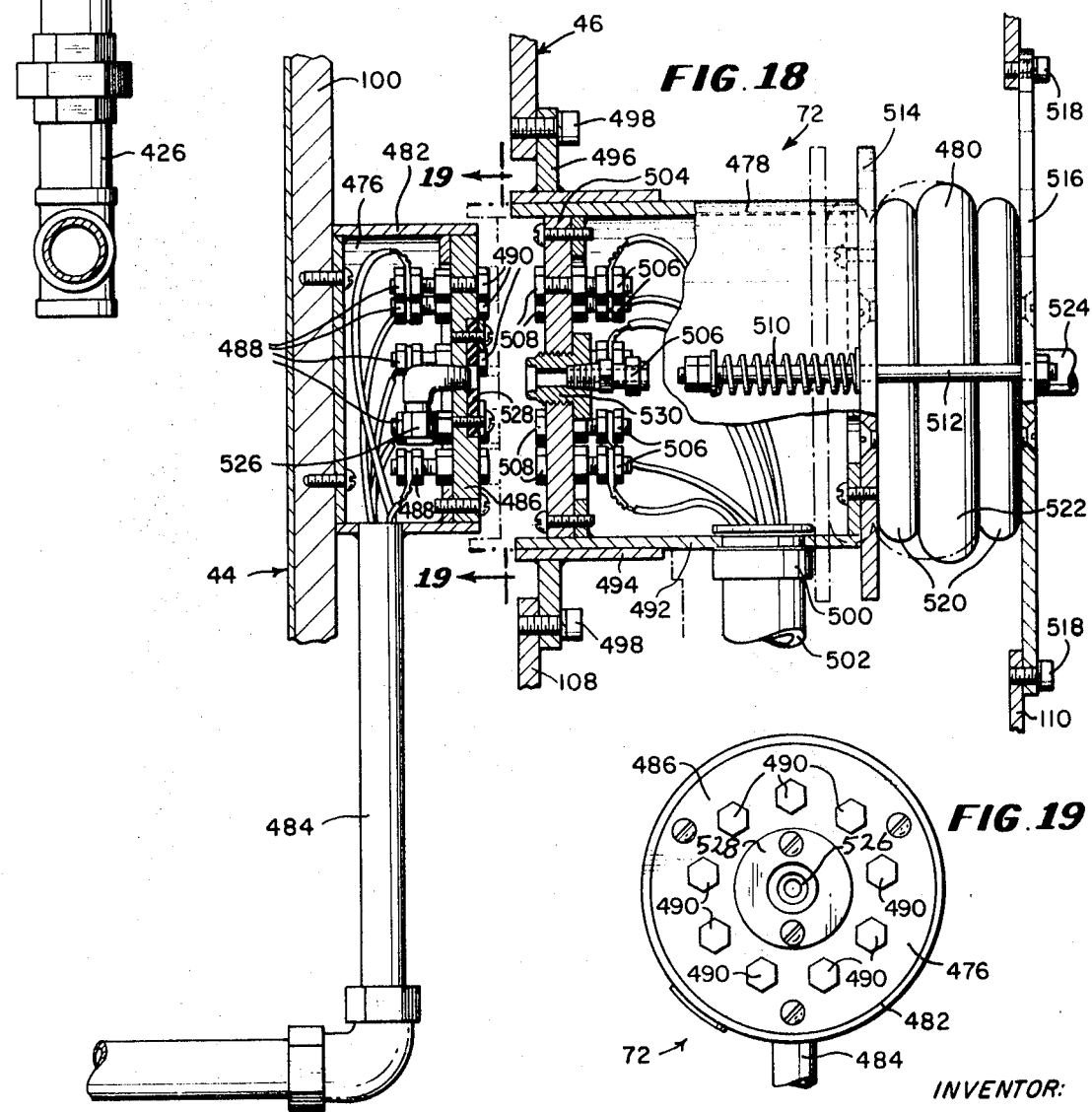
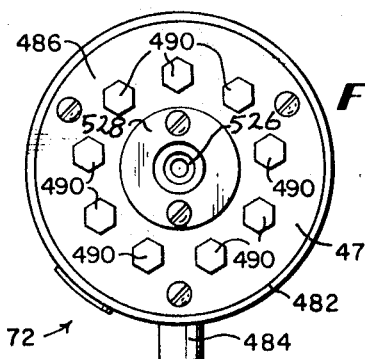
INVENTOR:
ALEX TOTH
BY Mason, Kolehmainen
Rathburn & Wyss
ATTORNEYS

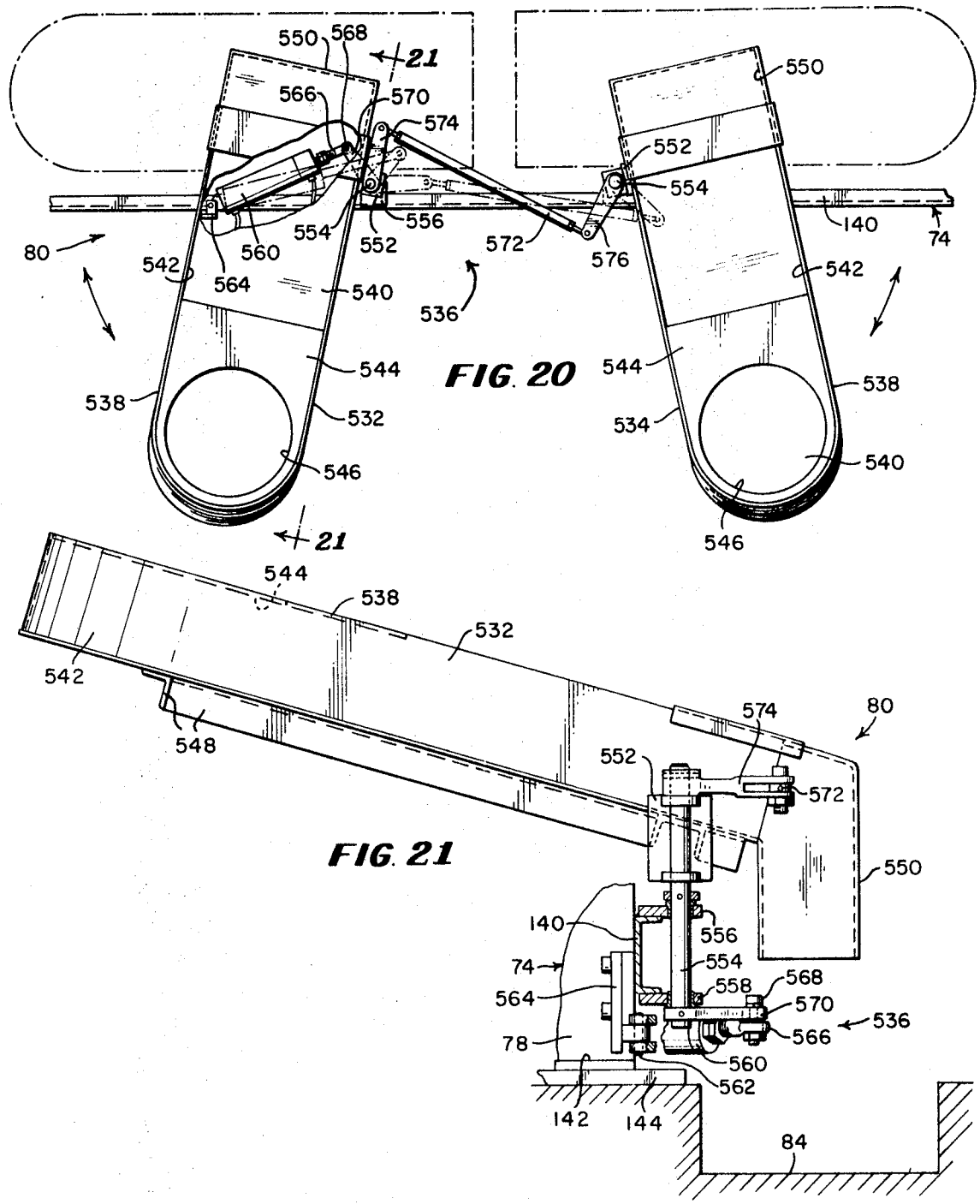

Oct. 19, 1971    A. TOTH    3,613,406
COMMERCIAL LAUNDRY MACHINE
Filed March 25, 1970    11 Sheets-Sheet 11
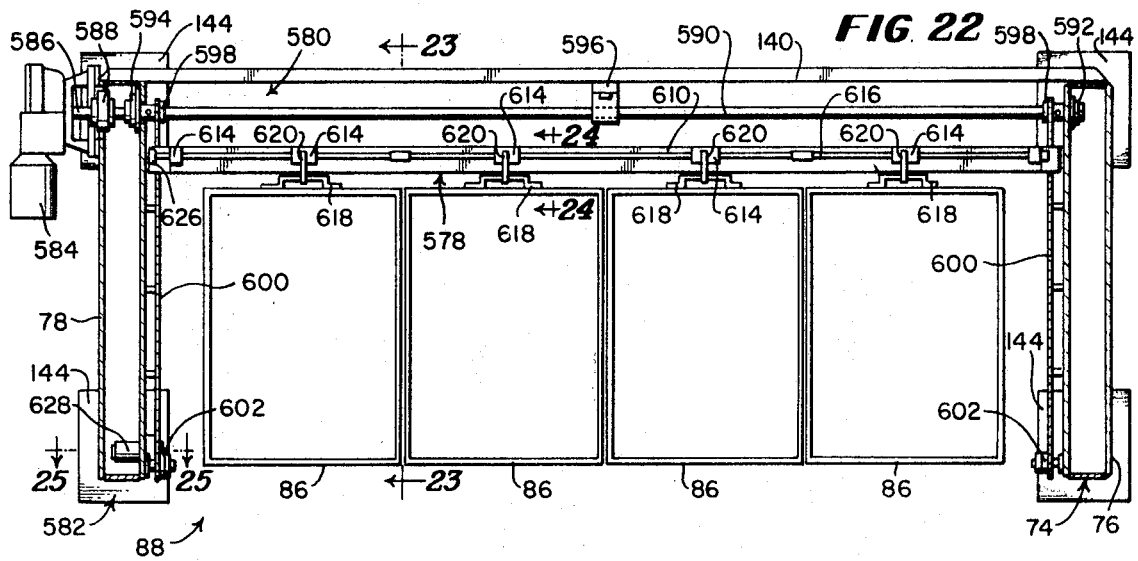
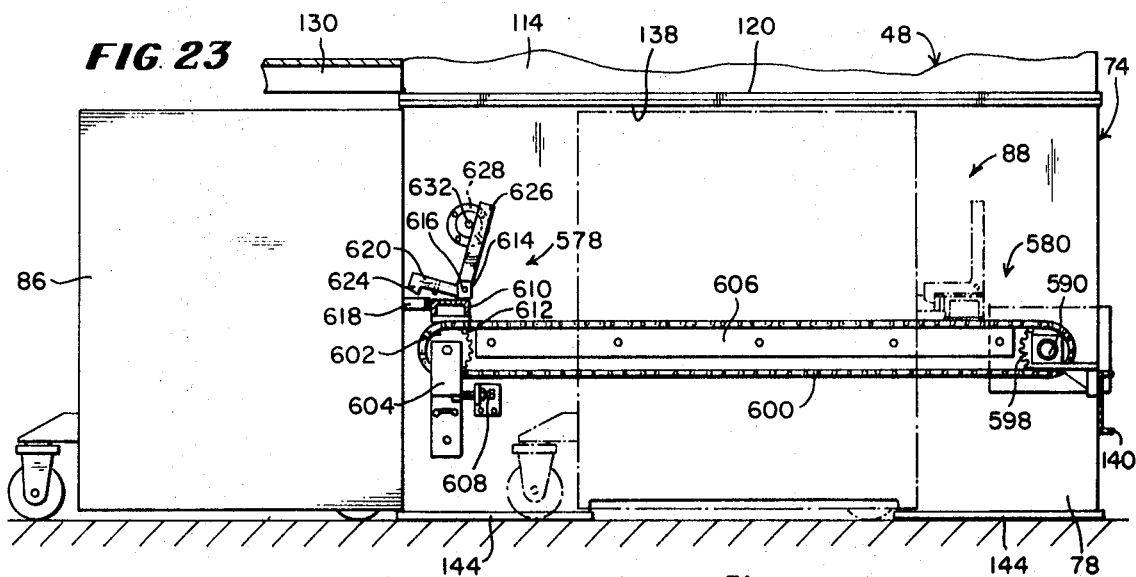
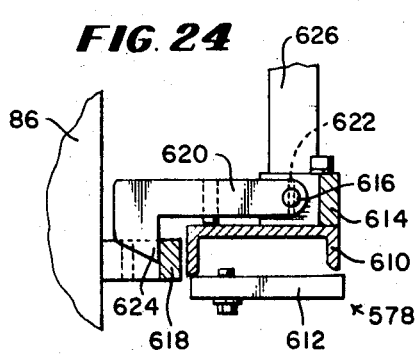
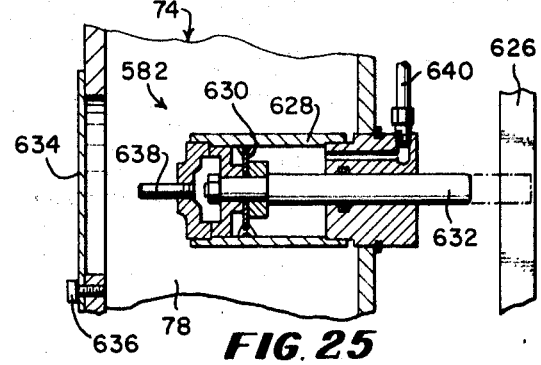
INVENTOR:
ALEX TOTH
BY Mason, Kolehmainen
Rathburn & Wyss
ATTORNEYS

United States Patent Office 3,613,406
Patented Oct. 19, 1971

3,613,406
COMMERCIAL LAUNDRY MACHINE
Alex Toth, Lincolnwood, Ill., assignor to
Ellis Corporation, Chicago, Ill.
Filed Mar. 25, 1970, Ser. No. 22,508
Int. Cl. D06f *21/04*
U.S. Cl. 68—140
23 Claims

ABSTRACT OF THE DISCLOSURE

A commercial laundry machine includes an inner perforated cylinder and an outer casing both mounted on a pair of end frames for rotation about their common central axis. Cylinder drive assemblies are coupled to opposite cylinder trunnions for rotating the cylinder during washing operations and each drive assembly includes a shock absorbing gear drive arrangement. A clutch or interlock system serves to fix the casing to the end frames, thereby to hold the casing stationary, or alternatively to fix the casing to the cylinder for simultaneous rotation of the cylinder and casing. Washing fluid, steam, electrical and pressurized air connections are selectively made from the end frames to the casing by means of releasable connection structures. Movably mounted drain chutes serve to transfer discharged washing fluids from the casing to a rear floor gutter, and are moved out of the way to clear the region beneath the machine for laundry carts. A cart positioning system moves carts between a convenient location at the front of the machine and an unloading position directly beneath the casing.

BACKGROUND OF THE INVENTION

The present invention relates to improvements in commercial laundry apparatus.

Commercial laundry machines of the type including a perforated inner cylinder for holding a washing load immersed in washing liquids contained within a surrounding outer casing are well known. Such machines include a drive system for rotating the inner cylinder during washing operations while the outer casing is stationary. To load the machine, doors in the cylinder are aligned with doors near the top of the casing. In order to unload the machine, it has been proposed to rotate both the cylinder and the casing about their common central axis in order to align the doors at the bottom of the machine. Machines of this type developed heretofore have not been entirely satisfactory for several reasons and have not been well suited for largely automated control of washing operations.

Accordingly, objects of the present invention are to provide an improved laundry machine of the type including concentrically rotatable casing and cylinder structures, and to provide improvements in the components thereof.

One problem encountered with known machines results from the large weight of the washing cylinder carrying a wet laundry load. In carrying out a washing operation, the inner cylinder and the load contained therein are rotated at substantial washing speeds. In order to achieve an effective washing action, it may be desirable at intervals to reverse the direction of rotation of the inner cylinder and laundry load. In many known arrangements the drive systems used to carry out the washing operation have not been capable of effective and reliable operation under heavily loaded conditions for long periods of time.

Objects of the present invention are to provide a washing apparatus having an improved drive system; to provide a drive system which is balanced in operation and which is sturdy and reliable; and to provide a drive system including shock absorbing structure of novel design.

Machines used in the past of the type including concentric rotatable cylinders and casings have used two types of casing drive arrangement. One type has included a first drive system for rotating the inner cylinder and a separate, independent drive system for rotating the outer casing during loading and unloading operations. In order to overcome the necessity for duplication of the drive system components, it has been suggested to mount the casing for rotation and to interconnect the casing and the cylinder when rotation of the casing is desired.

Further objects of the present invention are to provide an improved clutch or interlock assembly for fixing the casing to the machine frame to hold the casing stationary, and for interlocking the casing and cylinder for simultaneous rotation; to provide an interlock assembly which is strong yet easily and reliably operated; and to provide an improved operating linkage for controlling the interlock assembly.

In carrying out washing operations, washing liquids are introduced into the casing. Steam may be introduced for supplemental heating of the washing liquids. The interior of the casing may be interconnected with liquid level detection equipment. Electrical and/or pressurized air connections may be made with the casing for carrying out detection and control functions. It is necessary to make these connections in such a way that rotation of the outer casing during loading and unloading operations is not hindered.

Other objects of the present invention are to provide an improved releasable connection construction for interconnecting the casing with the fixed machine structure; to provide a connection adapted to automatic control; to provide a connection which does not interfere with the movement of the casing when released; and to provide a sturdy and reliable releasable connection that can readily be used for both fluid and electrical connections.

Laundry machines of the type including an outer casing rotatable about its central axis normally discharge both washing fluids and laundry loads at different times in the same region beneath the machine. This can give rise to problems because a drain structure such as a floor gutter or the like located directly beneath the machine may interfere with the unloading of laundry by, for example, obstructing the movement of a laundry cart beneath the casing.

Objects of the present invention are to provide a novel retractable drain arrangement for a laundry machine; and to provide a drain arrangement which does not obstruct the region beneath the machine when not in use.

In some laundry machine installations, wheeled carts may be used for transporting loads of laundry from the machine after the laundry operation is completed. It may be difficult and thus undesirable for the operator of the machine manually to move a cart into position beneath the machine and to pull the fully laden cart out from under the machine, particularly if the region in front of the machine is obstructed by a platform or the like.

Among the additional objects of the present invention are to provide an improved cart positioning assembly; and to provide an attachment for a laundry machine for moving carts into and out of unloading position beneath the machine.

SUMMARY OF THE INVENTION

In brief, a commercial laundry machine constructed in accordance with the principles of the present invention may comprise a perforated inner cylinder including a pair of end walls and circular cylindrical wall and a surrounding outer casing enclosing the cylinder and also including a pair of end walls and a circular cylindrical side wall. A pair of end frames are disposed on either side of the casing and cylinder and support both the casing and cylinder for rotation about their coincident central axis. The cylinder is rotated by means of a balanced pair of drive systems, one mounted on each end frame. The casing is either held stationary or rotated with the cylinder by means of a pair of interlock or clutch assemblies one associated with each end frame for fixing the casing either to the end frame or to the cylinder.

In accordance with a feature of the invention, each cylinder drive assembly includes a drive motor supported on the end frame drivingly coupled to the cylinder by means of a pair of rotatably supported and angularly disposed shafts. The shafts are interconnected by means of drive gears together with a novel drive transfer structure serving to absorb shocks transferred between the drive motor and the cylinder during operation of the machine.

Another feature of the invention resides in the provision of interlock assemblies for interlocking the casing with either the cylinder or the corresponding end frame. Each interlock assembly includes a first element fixed to the end frame and a second element mounted for rotation with the cylinder. The first and second elements are located in substantially parallel, spaced planes located normal to the rotational axis of the cylinder. A third element is sandwiched between the first and second elements and is axially shiftable and selectively engageable alternatively with the first and second interlock elements. Two interlock assemblies located in the two spaced end frames of the machine are operated by a single actuator through the agency of a linkage arrangement including a pull rod slidably disposed within a tie rod serving also to rigidly interconnect the end frames.

The laundry machine of the present invention includes several novel releasable connection assemblies for selectively establishing liquid, steam, pressurized air and electrical connections between the fixed structure of the machine and the rotatably mounted casing. Each connection includes a first connector structure mounted on one of the end frames for movement relative to the end frame. A second connector structure is mounted on the washer casing and is aligned with the first connector structure in a predetermined position of the casing. Actuator means connected to the support frame and to the first connector structure serve to move the first connector structure into engagement with the second structure.

In accordance with another feature of the present invention, the laundry machine includes a detachable base assembly for supporting the washer casing in a raised position above a floor surface. The casing includes a pair of dump valve assemblies which are opened in order to discharge washing fluids from the underside of the casing. A floor gutter or other fluid receiving means is preferably located beneath and to the rear of the washer and a chute is used for transferring discharged fluids from beneath the machine to the fluid receiving means. In accordance with the invention the chute is mounted for movement between an inactive position wherein it does not obstruct the region beneath the machine and an operating position wherein the inlets of the chutes are aligned with the dump valve assemblies and the outlets of the chutes are aligned with the floor gutter.

Another feature of the present invention resides in the provision of a cart positioning assembly including a cart engaging means mounted for movement of the base assembly. When an empty cart is positioned at a convenient location in front of the machine, the cart engaging means is engaged with the cart and a drive means serves to move the cart rearwardly until it is properly located beneath the machine. After the cart is filled with a laundry load, the cart engaging means is returned by the drive means to its initial position and released from the cart.

DESCRIPTION OF THE VIEWS OF THE DRAWINGS

The invention together with the above and other objects and advantages may be better understood with reference to the embodiment illustrated in the drawings, wherein:

FIG. 2 is a side elevational view of the washer of FIG. 1 taken from the left-hand side as viewed in FIG. 1;

FIG. 3 is a side elevational view of the opposite side of the washer of FIG. 1 with the drain assembly and the platform broken away;

FIG. 5 is a somewhat diagrammatic and simplified vertical sectional view of the washer of FIG. 1 illustrating the position of certain components during a washing operation;

FIG. 6 is a view similar to FIG. 5, with the platform broken away, illustrating the unloading position;

FIG. 7 is a view similar to FIG. 6 illustrating the loading position;

FIG. 8 is an enlarged fragmentary sectional view taken along the line 8—8 of FIG. 2 and illustrating structure including portions of one of the clutch or interlock assemblies of the washer;

FIG. 9 is an enlarged partly sectional view taken along the line 9—9 of FIG. 3 illustrating portions of one cylinder drive assembly;

FIG. 10 is an enlarged sectional view taken along the line 10—10 of FIG. 3 illustrating portions of one cylinder drive assembly;

FIG. 11 is a fragmentary broken sectional view on an enlarged scale taken along the line 11—11 of FIG. 2 and illustrating portions of the clutch or interlock assemblies of the washer;

FIG. 12 is a fragmentary side elevational and sectional view, partly broken away, taken along the line 12—12 of FIG. 11;

FIG. 13 is an enlarged, fragmentary, broken, front elevational view, partly in section, taken from the line 13—13 of FIG. 3 illustrating the releasable washing liquid connection;

FIG. 14 is an elevational view taken from the line 14—14 of FIG. 13;

FIG. 15 is an enlarged partly sectional elevational view taken along the line 15—15 of FIG. 2 illustrating the releasable steam connection;

FIG. 16 is a partly sectional view taken along the line 16—16 of FIG. 15;

FIG. 17 is an enlarged fragmentary sectional top view taken along the line 17—17 of FIG. 3 illustrating the releasable connection to the level detection assembly;

FIG. 18 is an enlarged sectional view taken along the line 18—18 of FIG. 3 illustrating the releasable connection for electrical conductors and a pressurized air line;

FIG. 19 is an elevational view taken from the line 19—19 of FIG. 18,

FIG. 20 is an enlarged fragmentary top view of portions of the drain assembly;

FIG. 21 is a sectional and elevational view taken along the line 21—21 of FIG. 20;

FIG. 22 is a top elevational and sectional view illustrating the cart positioning assembly;

FIG. 23 is an enlarged partly sectional side view taken along the line 23—23 of FIG. 22.

FIG. 24 is an enlarged sectional view taken along the line 24—24 of FIG. 22; and FIG. 25 is an enlarged sectional view taken along the line 25—25 of FIG. 22.

DESCRIPTION OF THE ILLUSTRATED EMBODIMENT

General arrangement

Figure 1:
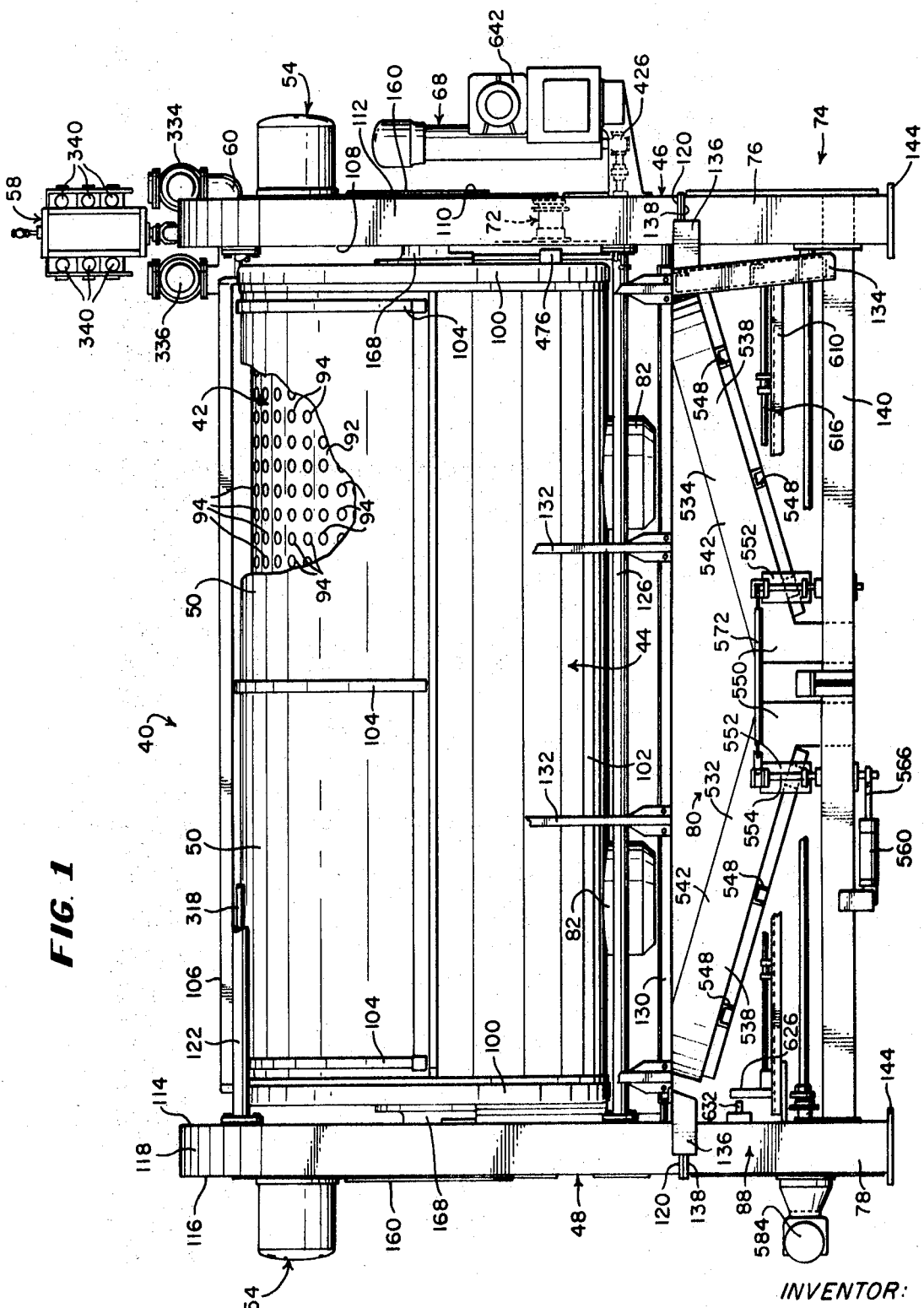
FIG. 1 is a front elevational view of a laundry apparatus in the form of a commercial washer constructed in accordance with the principles of the present invention.

Having reference now to the drawings there is illustrated a commercial laundry apparatus constructed in accordance with the principles of the present invention and designated as a whole by the reference numeral 40. In the illustrated arrangement the apparatus 40 comprises a commercial washer, but it should be understood that principles of the invention are applicable as well to apparatus such as washer-extractors, driers, and the like. In general, the washer 40 includes an inner washing cylinder 42 enclosed within a substantially fluid-tight cylindrical casing 44. The cylinder 42 and the casing 44 are mounted for rotation on right and left end frames 46 and 48. In order to provide access to the interior of the washer 40 the casing 44 includes a pair of axially spaced doors 50 and the cylinder 42 includes a series of complementary doors 52.

In accordance with one feature of the invention, the cylinder 42 and the casing 44 are both mounted for rotation about their common central axis (FIG. 8) to the end that the doors 50 and 52 can be aligned with one another and can be located at desired angular positions for loading and unloading of laundry. A pair of substantially identical cylinder drive assemblies both generally designated by the numeral 54 and incorporating a novel shock cushioning arrangement are mounted on the left and right end frames 46 and 48 and serve to rotate the cylinder 42 during washing operations, as well as for loading and unloading of the washer 40. The construction of one of the cylinder drive assemblies is shown in FIGS. 9 and 10.

A substantially identical pair of clutch or interlock assemblies generally designated by the numeral 56 function in accordance with a feature of the invention to interlock the casing 44 with the end frames 46 and 48 thereby to hold the casing 44 immobile during washing operations when the cylinder 42 is rotated. Alternatively, in order to rotate the casing 44 in carrying out loading and unloading operations, the casing 44 is interlocked with the cylinder 42, and the need for a separate drive is avoided. The construction of one of the clutch or interlock assemblies appears in FIGS. 8, 11 and 12.

One important aspect of the present invention resides in the provision of novel releasable connections between the fixed structure of the washer 40 and the movable casing 44 for selectively establishing liquid, steam, pneumatic and electrical communication. The novel connection assemblies of the present invention permit selective and convenient automatic control of the washing cycle and do not interfere with movement of the casing 44 during loading and unloading.

In carrying out washing operations with the washer 40, hot and cold water is mixed with suitable chemicals or the like from a supply header 58 in a mixer section 60, and the resulting washing fluids are channeled to the casing 44 through a releasable washing fluid connection generally designated as 62. Connection 62 is best illustrated in FIGS. 13 and 14 of the drawings.

Steam for providing additional heating of fluid contained within the casing 44 is supplied from a steam inlet fitting 64 and through a releasable steam connection generally designated as 66. The construction of this steam connection is illustrated in FIGS. 15 and 16.

A lever detection assembly 68 is mounted on the washer 40 and serves to provide an indicating or control function in response to the level or liquid within the casing 44. Communication is selectively established between the casing interior and the assembly 68 my means of a releasable fluid connection generally designated as 70 and illustrated in FIG. 17.

Electrical and pneumatic connections for carrying out sensing and control functions and the like are selectively established by means of a releasable electrical and air connection generally designated as 72. The construction of this releasable connection is illustrated in FIGS. 18 and 19.

The improved washer 40 is constructed in novel fashion to facilitate shipping and assembly, and to provide great versatility in installation and use. As illustrated in the drawings, the washer 40 is installed in a raised position above a base assembly generally designated as 74 including right and left end frame bases 76 and 78. In order to reduce the overall size of the unit during shipment, the end frame bases 80 and 82 may be detached from the end frames 46 and 48. In the event that vertical clearance is not sufficient for a raised installation, the washer may be floor-mounted by mounting the end frames 46 and 48 directly on the floor.

Associated with the base assembly 74 in accordance with the invention is a novel drain assembly generally designated by the reference numeral 80 and illustrated in FIGS. 20 and 21. During washing operations when washing fluids are discharged from a pair of dump valve assemblies 82 at the bottom of the casing 44, the drain assembly 80 transfers discharged fluid to a floor gutter 84 located to the rear of and below the washer 40. However, when it is desired to unload the laundry load into wheel carts 86 located beneath the washer 40, the drain assembly 80 is moved to a retracted position behind the washer 40.

In accordance with another feature of the invention, there is provided a novel cart positioning assembly generally designated by the reference numeral 88 for transporting the carts 86 from a convenient location in front of the machine to the unloading position, and for returning the carts to the front of the machine after they are filled. The cart positioning assembly is illustrated in FIGS. 22–25.

Construction of main components

Referring now in more detail to the construction of the main structural components of the washer 40, the cylinder 42 serves to hold a washing load indicated diagrammatically in FIG. 5 and designated by the letter "L" while permitting free communication of washing fluids held within the outer casing 44 to the interior of the cylinder 42. The cylinder 42 includes a pair of end walls 90 between which extends a circular cylindrical wall section 92 having a multitude of perforations 94 (FIG. 1). The cylinder 42 may be provided with one or more inner partitions (not shown) in order to segregate the interior of the cylinder into discrete sections. As best appears in FIGS. 5–7, the cylinder 42 includes a group of generally axially oriented radiated inwardly extending projections 96 for agitating the laundry load upon rotation of the cylinder during a washing cycle. Slide members 98 of conventional construction are mounted on the cylinder end wall members 90 and on any intermediate wall members in order to guide movement of the cynder doors 52 between their closed position (FIG. 5) and their open position (FIGS. 6 and 7).

The outer casing 44 of the washer 40 encloses the cylinder 42 with sufficient clearance for independent rotation of the cylinder 42 and serves as a container for washing liquids during the washing cycle. The casing 44 includes a pair of end walls 100 mounted outwardly of the end walls 90 of the cylinder 42 and mounted inwardly of the right and left end frames 46 and 48. A circular cylindrical casing wall 102 extends between the end walls 100. Supports 104 are mounted on the cylinder wall 102 for slidably supporting the casing doors 50 for movement between their closed position (FIGS. 1, 4 and 5) and their open positions (FIGS. 6 and 7). The wall 102 of casing 44 includes a deck structure 106 located at the top of the casing 44 in the washing position of the casing. An operator may use the deck 106 to gain access to laundry loading equipment or the like located above the washer 40.

In order to provide a trim appearance while permitting ready access to various components of the washer 40, the end frames 46 and 48 serve not only as supports, but also comprise hollow housings or enclosures for various portions of the structure of the washer 40. The right end frame 46 includes an inner wall 108, a spaced outer wall 110 and a peripheral wall 112. Similarly the left end frame 48 includes inner and outer walls 114 and 116 a peripheral wall 118. As appears in greater detail below, convenient access is provided to various regions of the interiors of end frames 46 and 48 for installation, adjustment and servicing of the washer 40. The end frames 46 and 48 also include base plates 120 for supporting the end frames 46 and 48, the casing 44 and the cylinder 42 on the base assembly 74 or other support. Tie rods 122, 124, 126 and 128 extend between the end frames 46 and 48 radially outward of the casing 44 in order to provide rigidity.

In order to support an operator at a convenient position in front of the washer 40, a platform 130 is provided. The platform 130 includes a guard rail 132 and a ladder 134 and is supported in part by a pair of side supports 136. Although in the illustrated construction the platform 130 is mounted in a fixed position, it may if desired be slidably supported for reciprocal movement toward the washer. Thus, as illustrated in FIGS. 1 and 2, the platform 130, rail 132 and ladder 134 are shaped to fit in the space beneath the casing 44 and between the end frames 46 and 48.

One advantage of the washer 40 of the present invention is the versatility in the manner in which the washer can be installed and used. The base plates 120 of end frames 46 and 48 in the illustrated arrangement rest upon the base assembly generally designated as 74 and more specifically upon cooperating top plates 138 of the right and left end frame bases 76 and 78. However, the washer 40 comprises a complete and operative unit in the absence of the illustrated base assembly 74. For example, in some installations the end frames 46 and 48 may be mounted directly on or above a floor surface, and the unloading of the washer 40 as well as the removal of washing fluids may take place through floor openings or the like.

Referring now more specifically to the construction of the base assembly 74, the end frame base members 76 and 78 preferably comprise hollow members similar in cross sectional shape to the right and left end frames 46 and 48. A channel brace 140 extends between the members 76 and 78 to provide rigidity. Frames 76 and 78 include base plates 142 supported on the floor surface by means of foot plates 144.

Both the inner cylinder 42 and the outer casing 44 are mounted in simple and rugged fashion for rotation with respect to the end frames 46 and 48. Having reference now more specifically to FIG. 8 of the drawings, the structure for mounting the cylinder 42 and casing 44 to the left end frame 48 is illustrated in detail. The corresponding structure associated with the right end frame 46 is substantially similar and accordingly is not illustrated.

Each end wall of the cylinder 42 is attached by fasteners 146 to an outwardly extending trunnion shaft 150, this arrangement providing study support not only for the weight of the cylinder 42 but also for the substantial additional weight of a wet washing load. The outer end of each trunnion shaft 150 is fixed by means of a key 152 to a main gear 154 held in place by means of a cap washer 156 and a bolt 158. Convenient access through the end frame outer wall 116 to the region of the main gear 128 is provided by a removable cover plate 160 held in place by screws 162.

In order to permit rotation of the casing 44 with respect to the cylinder 42, the casing end wall 100 is mounted for rotation about the cylinder trunnion shaft 150. More specifically, a series of bolts 164 serves to fasten the end wall 100 to the flange portion 166 of a gland housing 168 surrounding a portion of the trunnion shaft 150. A gasket 170 is sandwiched between the end wall 100 and the flange 166 to prevent leakage of washing fluids from the interior of the casing 44.

The gland housing 168 defines an interior gland chamber 172 within which is disposed a spring loaded seal assembly 174 for preventing the entry of washing fluids from the interior of the casing 44 into the gland chamber 172. Leakage fluid from the chamber 172 is removed by means of a drain fitting 176 and a flexible drain conduit 178. A slinger fitting 180 and a seal plate 182 prevent the leakage of fluid from the chamber 172 to the region of the bearings for the trunnion shaft 150.

A bearing structure is provided for rotatably supporting both the cylinder 42 and casing 44 for rotation independently of one another and with respect to the end frame 48. A bearing retainer 184 is attached to the gland housing 168 by means of a plurality of bolts 186. A first bearing 188 is supported between the trunnion shaft 150 and the bearing retainer 184 and provides for relative rotation between the cylinder 42 and the casing 44. A second bearing 190 supported between the bearing retainer 184 and a bearing housing 192 attached to the inner wall 114 of the end frame 48 by means of screws 194 provides for rotation of the casing 44 relative to the end frame 48. A system of lubrication passages 196 within the bearing retainer 184 are supplied with lubricant for the bearings 188 and 190 through a flexible conduit 198.

Cylinder drive assemblies

During operation of the washer 40, the cylinder 42 is rotated at substantial washing speeds by means of the cylinder drive assemblies generally designated as 54. In order to provide an effective washing action, the cylinder is not only rotated, but in addition the direction of rotation is reversed at frequent intervals. Substantial drive forces are required in order to reverse the drive of the cylinder at frequent intervals because of the large momentum to be overcome, resulting not only from the weight of the cylinder 42 but also from the weight of a load of washing. The pair of drive assemblies 54 operating in balanced fashion on the opposite ends of the cylinder 42 are substantially identical. The construction of one assembly 54 is shown in FIGS. 9 and 10.

In general, each drive assembly 54 includes a reversible drive motor 200, a coupling assembly 202 and a gear assembly 204 for driving a pinion 206 (FIG. 10) engaging the corresponding main drive gear 154 attached to the corresponding cylinder trunnion shaft 150. In accordance with an important feature of the invention the gear assemblies 204 each include a novel cushioned gear mount arrangement generally designated as 208 serving to cushion or absorb the shocks and loads created upon starting, stopping and reversal of the rotational direction of the cylinder 42.

In the illustrated embodiment of the invention the drive motors 200 may, for example, comprise five horsepower electric motors each including a housing 210 and a motor shaft 212. The motor housing 210 is bolted to a housing 214 of the coupling assembly within which is disposed a flexible coupling 216 interconnecting the motor shaft 212 with an intermediate shaft 218. The coupling assembly housing 214 is bolted to a housing 220 of the gear assembly 204, and the shaft 218 extends into the gear assembly housing 220 and carries a bevel pinion 222. The shaft 218 is supported for rotation by means of a bearing assembly 224 supported in a sleeve 226 of the coupling housing 214.

In order to position the gear assembly housing 220 on the outer wall 110 of the right end frame 46, there is provided an adapter plate 228 fastened to the housing 220 by screws 230 (FIG. 10) and to the wall 110 by screws 232 (FIG. 9). The main drive pinion 206 is supported upon a pinion shaft 234, and proper driving engagement is maintained by the adjustment of plate 228 relative to a mounting bar 236 fastened to the wall 110 and including fine adjustment screws 238 for precise positioning.

In accordance with a feature of the present invention, the gear assembly 204 includes the novel cushioned gear mounting arrangement 208 for translating movement of the intermediate shaft 218 to movement of the pinion shaft 234. More specifically the bevel pinion 222 engages the gear teeth of a spiral bevel gear 240 encircling the pinion shaft 234. Gear 240 is mounted upon a generally circular support or gear plate 242 and a resilient, shock absorbing or cushioning connection is provided between the plate 222 and the shaft 214. A generally circular support or flange fitting 244 supported on the shaft 234 within the gear assembly housing 220 interfaces with and slidably engages the plate 242 and includes a plurality of spaced openings each including a resilient bushing element 246 (FIG. 10) preferably formed of an elastomeric material such as rubber, plastic or the like. Each flexible bushing receives a sleeve 248 and a screw 250 threaded into the gear support plate 242. The opposite side of the flange fitting 244 supports an additional plate 252, the plates 242 and 252 effectively being sandwiched around and slidably related to the flange 244 and bushings 246.

When the shaft 218 is rotated by motor 200 and coupling 216, the bevel pinion 222 rotates the spiral bevel gear 240 and rotation of the gear 240 is imported to the gear support plate 242 and thus to the screws 250 and sleeves 248. Force is transmitted by way of the resilient bushings 246 to the flange 244 and the pinion shaft 234. As a result, shocks incident to the reversal and start up of the cylinder 42 are effectively cushioned or absorbed by the flexible bushings 246.

In order to support the pinion shaft 234 for rotation, the gear assembly housing 220 includes a bearing support 254 (FIG. 10) including a first bearing assembly 256. A second bearing assembly 258 is supported within a bearing cover 260. The housing includes a breather 262 and a drain plug 264.

Clutch assemblies

In accordance with a feature of the present invention the washer 40 is provided with a novel clutch or interlock arrangement for causing the casing 44 to be rotated together with the cylinder 42 to the loading and unloading positions, and alternatively for holding the casing 44 in a fixed position while the cylinder 42 is rotated during washing operations. In order to avoid the necessity for two separate drive systems for the casing 44 and the cylinder 42 respectively, the clutch assemblies generally designated as 56 operate in novel manner to fix or lock the casing 44 to the end frames 46 and 48 during washing operations and to fix or lock the casing 44 to the cylinder 42 during loading and unloading operations. As a result, the casing 44 in a simple and reliable manner is either held stationary or is rotated by a sturdy and balanced driving connection to the cylinder 42.

With reference now more particularly to FIGS. 8, 11 and 12, the clutch assembly 56 associated with the end frame 48 is illustrated in detail. The clutch assembly 56 associated with the right end frame 46 is substantially identical, and consequently is not fully illustrated in the drawings.

Having reference first to FIG. 8, a casing drive plate 266 is provided in order to permit a driving connection or a locking connection to be made to the structure of the casing 44 or to the fixed washer structure respectively. The plate 266 is fastened to the bearing retainer 184 by screws 268 and the plate 266 extends radially outwardly of the trunnion shaft 150 in the region between the inner wall 114 of the end frame 48 and the main gear 154.

An axially shiftable cage structure 270 includes a series of drive pins 272 slidably received in collars 274 mounted at circumferentially spaced locations around the drive plate 266. Each drive pin 272 includes an enlarged central portion held captive between two side plates 276 and 278 of the cage 270. A spacer ring 280 cooperates with the peripheral portions of the plates 276 and 278 to define a circular groove 282 around the cage 270. Each drive pin 272 further includes opposed beveled nose portions extending outwardly of the side plates 276 and 278.

In order to interlock the casing 44 alternatively with the end frame 48 or with the cylinder 42, the cage 270 is axially shifted to slide the pins 272 in an axial direction through the collars 274. In the position of the cage 270 illustrated in FIG. 8 nose portions of the drive pins 272 engage a series of bushings 284 supported in the bearing housing 192 fixed to the end frame 48. Consequently, in this position rotation of the casing drive plate 266 and thus of the casing 44 is prevented by engagement of the drive pins 272 with the fixed structure of the washer 14.

In order to interlock the casing 44 with the cylinder 42 for rotation of the casing 44 during loading and unloading operations, the cage 270 is axially shifted to its alternate position. More specifically, the cage 270 and the pins 272 are moved axially outwardly of the casing 44 in order to disengage the pins 272 from bushings 284 and to engage the opposite nose portions of the pins 272 with bushings 286 mounted in the main gear 154. In this position, the casing drive plate 266 is effectively interlocked by the drive pins 272 with the main gear 154, and thus with the cylinder 42 by means of the trunnion 150. In this position therefore rotation of the cylinder 42 results in corresponding rotation of the casing 44.

In order selectively to control the axial shifting movement of the cage 270, there are provided a pair of shifting forks 288 (FIGS. 11 and 12). A suitable actuator which in the illustrated embodiment of the invention comprises a pneumatic cylinder 290 serves to control both clutch assemblies 56 by operation of the shifting forks 288 through the agency of a control linkage generally designated as 292 and best illustrated in FIG. 11.

Each shifting fork 288 includes a pair of legs 294 spanning half the circumference of the cage 270. Each leg carries a follower element 296 riding in the annular groove 282 of the cage 270. The forks 288 include shank portions 298 pivoted on pivot brackets 300 supported on the inner walls 108 and 114 of the end frames 46 and 48 respectively.

The control linkage 292 serves simultaneously to operate both of the shifting forks 288 by applying a pivoting force simultaneously to the shanks 298. The pneumatic cylinder 290 includes a piston 302 coupled to a pair of toggle levers 304 and 306 slidably mounted with respect to a guide 308. The toggle lever 304 applies a pivoting force to one shifting fork 288 by means of a first lever 310 pivoted on a bracket 312 and a pivot link 314 coupled between the lever 310 and the shank 298.

In accordance with a feature of the invention, the toggle lever 306 is coupled across the width of the machine to a lever 316 in novel manner by means of a pull rod 318 slidably received within the tie rod 122. A lever 316 is pivoted on a bracket 320 and is coupled by a link 322 to the shank portion 298 of the corresponding shifting fork 288. A pair of springs 324 and 326 bias the levers 310 and 316 to the illustrated normal position wherein the casing 44 is held in its stationary position by the clutch assemblies 56. When rotation of the casing 44 is desired, the pneumatic cylinder 290 is pressurized.

RELEASABLE CONNECTIONS

In accordance with important aspects of the present invention, novel releasable connections generally designated as 62, 66, 70 and 72 are provided for communicating fluids including washing liquids, steam and pressurized air, as well as electrical circuits selectively to the movable casing 44 of the washer 40. The releasable connections are simple in construction, provide for convenient automatic control of the washing operation, and are largely concealed so that they do not detract from the appearance of the machine, but nevertheless are conveniently accessible for installation, adjustment and repair. When not in use, the connections do not interfere with rotation of the casing 44.

Figure 4:
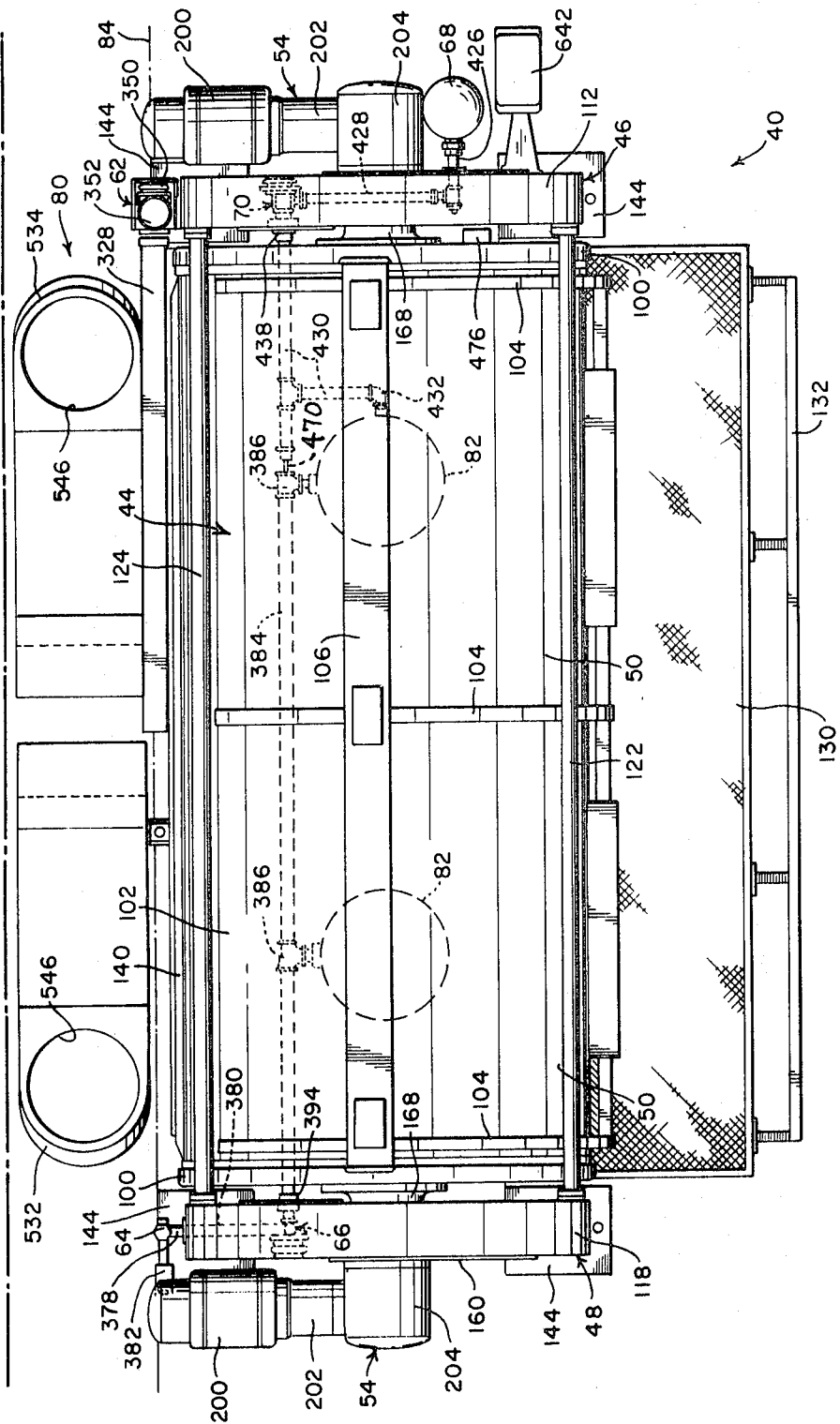
FIG. 4 is a top view of the washer of FIG. 1.

Referring first to the releasable connection generally designated as 62 for introducing washing liquid to the interior of the casing 44, this connection is best illustrated in FIGS. 13 and 14 of the drawings. The circular cylindrical wall 102 of the casing 44 supports a generally rectangular supply fluid header 328 extending between an opening 330 located substantially in the center of the wall 102 and one end of the casing 44. In the illustrated embodiment of the invention, and as best illustrated in FIGS. 4 and 13, the header 328 extends from the center of the casing 44 to the right hand end of the structure as viewed in FIG. 4. The header 328 is provided with an open inlet end 332 opening outwardly of the cylinder 44. The releasable connection 62 serves selectively to permit fluid communication with the interior of the casing 44 by selectively establishing a connection to the inlet end 332 of the header 328.

The fluid mixer section generally designated as 60 includes a hot water inlet 334 and a cold water inlet 336 adapted selectively to be connected with a suitable water supply. In addition, there is provided a conduit 338 for introducing suitable chemicals supplied from the header 58 into mixer section 60. A plurality of pneumatically controlled supply valves 340 are interconnected to suitable supplies of washing materials such as soap, blueing, bleach, sour, starch and the like and are opened and closed at predetermined points during a washing cycle. In order to provide for calibration of the supply header 58, the conduit 338 includes an additional outlet 342 bypassing the mixer section 60 but normally blocked by a cap 344.

In accordance with the invention, the releasable connection 62 frees the casing 44 for unobstructed rotation when not in use, yet provides a reliable fluid connection upon demand. In general the connection 62 includes a flexible supply conduit 346, a connector structure 348 and a pneumatic actuator 350 for moving the structure 348 into engagement with the header 328.

More specifically, the connector structure 348 includes a conduit 352 having an outlet 354 carrying a resilient sealing gasket 356. Gasket 356 is pressed into sealing relation against the edge of header inlet 332 by operation of actuator 350. Actuator 350 is sandwiched between a fixed support plate 358 and a movable plate 360 slidably related to one another by pins 362. Springs 364 normally urge the movable plate 360 toward the plate 358, and since the movable plate 360 is attached to conduit 352 by bolts 364, the springs also normally urge the outlet 354 away from the inlet 332.

Actuator 350 expands when supplied with pressurized air through a conduit 366. The actuator includes rigid end sections 368 attached to the plates 358 and 360 and a flexible, expansible central section 370. The actuator may be similar in construction to the actuator of the releasable steam connection 64 illustrated in sectional detail in FIG. 16. When pressurized, actuator 350 expands and forces the gasket 356 tightly into sealing relation with the inlet 332 thereby to establish communication between the mixer 60 and the header 328.

The fixed support plate 358 is mounted on a base 372 by structure including a strut 374. A bracket 376 holds the connection 62 in place on the wall 112 of the end frame 46.

In order to heat washing liquids contained in the casing 44, steam is introduced into the interior of the washer through the steam inlet fitting 64 and the releasable steam connection generally designated as 66. Having reference more particularly now to FIGS. 15 and 16, steam supplied through the inlet fitting 64 flows through a rigid conduit section 378 supported to the rear of the end frame 48 to a flexible conduit 380 disposed between the inner and outer walls 114 and 116 of the end frame 48. A pressure relief valve 382 is provided adjacent the inlet 64. Steam flowing through the flexible conduit 380 reaches the releasable steam connection 66 from which it is selectively applied through a steam conduit 384 and a pair of fittings 386 (FIG. 4) to the interior of the casing 44 by way of the dump valve assemblies 82.

Referring more specifically to the construction of the releasable steam connection 70, as illustrated in FIGS. 15 and 16 the flexible conduit 396 is coupled to a connector structure 388 movable by a pneumatic actuator 392 into sealing relation with an inlet end or edge 394 of the steam conduit 384. The connector structure 388 includes a conduit 396 having an outlet fitting 398 slidable in a sleeve 400 mounted in a removable plate 402 attached to wall 114 by screws 404. Fitting 398 includes a gasket 406 pressed into sealing relation with the inlet 394 by actuator 392. Actuator 392 is located between a fixed plate 408 held against wall 116 by screws 410 and a movable plate 412 slidably related to plate 408 by pins 414, and springs 416 normally urge the movable plate 412 toward the fixed plate 408. Conduit 396 is attached to movable plate 412 by a bracket 418 (FIG. 16), and as a result normally the outlet 398 is spaced from the inlet 394 as illustrated in full lines in FIG. 15.

Actuator 392 is sandwiched between the plates 408 and 412 and expands when supplied with pressurized air through a conduit 420. The actuator includes rigid end sections 422 attached to the plates 408 and 412 and a flexible expansible central section 424. When pressurized, actuator 392 expands and forces gasket 406 tightly against inlet 394 as illustrated in FIG. 16 thereby establishing communication between steam inlet fitting 64 and the interior of the casing 44.

Having reference now to FIG. 17, the washer 40 of the present invention is provided with the novel releasable connection generally designated as 70 for providing selective intercommunication between the interior of the casing 44 and a water level indicator or control device generally designated as 68 which may be of any desired construction. The device 68 is coupled by means of a conduit 426 (FIGS. 1 and 3) to a flexible conduit 428 (FIG. 17) disposed between the inner and outer walls 108 and 110 of the right hand end frame 46. The releasable connection 70 serves selectively to establish fluid communication between the level indicator 68 and a fluid conduit 430 supported on the outside of the casing 44 and connected to a fitting 432 (FIG. 4) communicating with the dump valve assembly 82 and thereby with the interior of the casing 44.

Connection 70 includes a connector structure 434 movable by an actuator 436 into sealing relation with the inlet end or edge 438 of the conduit 430. The connector structure 434 includes a conduit 440 having an outlet fitting 442 slidable in a sleeve 444 mounted in a removable plate 446 attached to wall 108 by screws 448. Fitting 442 includes a gasket 450 capable of being pressed into sealing relation with the inlet 438 by actuator 436. A fixed plate 452 is held against wall 110 by screws 454 and a movable plate 456 is slidably related to plate 452 by pins 458. Springs 460 normally urge the movable plate 456 toward the fixed plate 452. Conduit 440 is attached to movable plate 456 by a bracket 462, and as a result normally the outlet 442 is spaced from the inlet 438 as illustrated in full lines in FIG. 17.

Actuator 436 is sandwiched between the plates 452 and 456 and expands when supplied with pressurized air through a conduit 464. The actuator includes rigid end sections 466 attached to the plates 452 and 456 and a flexible expansible central section 468. When pressurized, actuator 436 expands and forces gasket 450 tightly against inlet 438 as indicated in broken lines in FIG. 17 thereby establishing communication between the level detection assembly 68 and the interior of the casing 44.

In order to balance the forces involved when the releasable steam connection 66 and the releasable fluid connection 70 are simultaneously actuated, a force transfer bar 470 (FIG. 4) is mounted between the axially aligned steam conduit 384 and fluid conduit 430. In this manner there is no tendency for the fluid fitting 432 or the steam fittings 386 to be stressed by the establishment of connections with the conduits.

Referring again to FIG. 17, it can be seen that the inner and outer walls 108 and 110 of the end frame 46 are provided with removable wall sections 446 and 452, as well as an addition removable plate 472 removably held in place on the wall 108 over the inlet end of flexible conduit 428 by screws 474. In this manner, although the releasable connection 70 is hidden and protected by the surrounding end frame structure, nevertheless access to the connection 72 and associated conduits is readily obtained by removal of the desired plate section.

In order to control the operation of components of the washer 40 and in order to detect various conditions such as temperatures existing within the casing 44 during washing operations, it is desirable selectively to establish electrical and pneumatic connections between the fixed structure of the washer and the casing 44. Referring now more particularly to FIGS. 18 and 19 of the drawings, the electrical and air releasable connection generally designated as 72 is illustrated.

In general the electrical and air releasable connection 72 includes a first relatively fixed connection box 476 attached to the end wall 100 of the casing 44, and a second relatively movable box 478 slidably mounted within the right end frame 46. Normally the connection boxes 476 and 478 are spaced from one another to permit free rotation of the casing 44. A pneumatic actuator 480 serves selectively to interconnect the connection boxes thereby to establish electric and pressurized air connections.

More specifically, the connection box 476 includes a circular metal housing 482 bolted to the wall 100 of the casing 44 and communicating with an electrical conduit 484 through which a group of electrical conductors are connected to various desired items upon or within the casing 44 such as, for example, electrical temperature sensing devices or the like. The box 476 also includes an outer wall 486 formed of insulating material and supporting a plurality of terminals 488 to which the electrical conductors are connected. The terminals 488 include electrical contact portions 490 disposed on the outer surface of the wall 486.

The second connector box 478 includes a circular wall 492 slidably mounted in a sleeve 494 carried by a plate 496 removably attached to the inner wall 108 of the end frame 46 by screws 498. A group of electrical conductors are fed in through a connector 500 and a flexible conduit 502 to the interior of the connector box 492. The box includes an inner wall 504 formed of electrically insulating material and supporting a group of terminals 506 to which the electrical conductors are connected. The innermost portions of the terminals 506 form a series of contacts 508 disposed on the inner surface of the wall 504 and aligned with corresponding contacts 490 of the first connector box 476.

The pneumatic actuator 480 serves to control the position of the slidably mounted connection box 478 in order selectively to establish electrical connections with the contacts 490. In the position illustrated in full lines in FIG. 18, a pair of springs 510 telescoped around pins 512 serve to urge a movable actuating plate 514 toward a fixed plate 516 held to wall 110 of end frame 46 by screws 518. In this position the box 478 is free to rotate along with the casing 44. The pneumatic actuator 480 includes a pair of rigid end sections 520 attached to walls 514 and 516, together with an expansible central section 522. When the actuator is pressurized by pressurized air applied through a conduit 524, the central section 522 expands and moves the plate 514 against the force of springs 510 in order to slide the connection box 478 toward the casing 44. Electrical contact is established between fixed contacts 490 and the movable contacts 508 thereby electrically to interconnect the inlet and outlet electrical conductors.

In order to carry out desired control functions such as, for example, the control of the pneumatically operated dump valve assemblies 82, the casing 44 is selectively interconnected with a supply of pressurized air. For this purpose, the connector box 476 includes a pressurized air fitting 526 surrounded by a resilient gasket 528. The second connection box 492 includes a fitting 530 having a lip pressed into sealing engagement with the gasket 528 when the connection box 478 is moved to its alternate position by operation of the pneumatic actuator 480. Suitable pneumatic conduits, omitted from the drawings for purposes of simplicity, connect the fittings 526 and 530 to the dump valve assemblies 82 and with a source of pressurized air.

Drain assembly

An important object of the present invention resides in the provision of the drain assembly generally designated as 80 and illustrated in FIGS. 1, 2, 4, 20 and 21. The drain assembly 80 permits the discharge of washing fluids from the dump valve assemblies 82 into the gutter 84 located out of the way at the rear of the washer 40 without obstructing the region beneath the casing 44 where unloading of laundry takes place. In general, the drain assembly 80 includes a pair of chutes 532 and 534 movable from an inactive position (FIGS. 1, 2 and 4) wherein they are out of the path of carts 86 located in unloading position beneath the washer 40 to an operating position (FIGS. 20 and 21) wherein the chutes 532 and 534 extend from the dump valve assemblies 82 to the gutter 84. An operating assembly generally designated as 536 serves selectively to move the chutes 532 and 534 between their respective positions.

More specifically, each chute 532 and 534 includes an inclined segment 538 having a bottom wall 540 and a side wall 542 with a rounded inlet portion adapted to be positioned beneath the corresponding dump valve assembly 82. Upper walls 544 serve to prevent splashing and are provided with circular openings 546 for receiving fluids from the corresponding dump valve assembly 82. The undersides of the bottom walls 574 are reinforced by channel members 548 to enable the chutes to withstand the weight of discharged washing liquids. The lowermost ends of the chutes 532 and 534 are provided with downspout segments 550 adapted to discharge fluids downwardly into the gutter 84 in the operating position of the chutes.

The chutes 532 and 534 are pivotally mounted for rotational movement between their operating and standby positions. Each chute includes a bracket 552 mounted on the chute side wall 542. The bracket 552 is fixed to a pivot shaft 554 rotatably mounted in brackets 556 and 558 (FIG. 21) attached to the channel brace 140.

The operating assembly 536 includes a double acting pneumatic cylinder 560 selectively operated from a source of compressed air in order to move the chutes 532 and 534 between their positions. One end of the cylinder is pivotally mounted by a pin 562 to a support bracket 564 carried by the brace 140. Piston 566 of the cylinder 564 is attached by a pin 568 to a crank arm 570 fixed to the pivot shaft 554 associated with the chute 532. Conjoint simultaneous movement of the chutes 532 and 534 is caused by a link 572 connected for pivotal movement between a pair of crank arms 574 and 576 fixed to the pivot shafts 554.

In the operating position of the drain assembly 80 as illustrated in FIGS. 20 and 21, fluid from the dump valve assemblies 82 enters the openings 546 of the chutes 532 and 534 and is discharged through the downspout segments 550 into the gutter 84. When the double acting cylinder 560 is operated to its alternate position shown in broken lines in FIG. 20, the crank arm 570 produces rotation of the corresponding pivot shaft 554 and consequently rotation of the chute 532. Due to the crank arms 574 and 576 and link 572, the chute 534 is rotated simultaneously, and both chutes are moved to the standby or inactive position illustrated in FIGS. 1, 2 and 4 and illustrated in broken lines in FIG. 20. Advantageously, in this position the region beneath the washer is unobstructed so that wheeled carts 86 may be positioned for an unloading operation.

Cart positioning assembly

In many installations of the washer 40, such as the illustrated arrangement wherein the platform 130 is located at the front of the washer, it is undesirable for the operator of the washer manually to move the wheeled carts 86 into position directly under the machine for unloading of a laundry load and for the operator manually to pull the heavily laden carts out from under the machine after the machine has been unloaded. In accordance with an important aspect of the present invention the cart positioning assembly generally designated as 88 is provided for moving the wheeled carts 86 between a convenient and easily accessible location at the front of the washer 40 (FIG. 23) to the laundry unloading location wherein the carts are positioned directly beneath the center of the casing 44 of the washer 40 (FIG. 22). The assembly 88 not only frees the operator of the task of moving the carts for the unloading operation, but also assures that the carts are positioned properly and uniformly to receive the discharged laundry load.

Referring now more specifically to FIGS. 22–25, the construction of the cart positioning assembly 88 is illustrated. In general the assembly 88 includes a slide assembly generally designated as 578 adapted releasably to be latched to the carts 86 and movable between positions by a chain drive system generally designated as 580. A release mechanism generally designated as 582 controls the attachment of the slide assembly 578 to the wheeled carts 86.

Power for operation of the cart positioning assembly 88 is provided by a reversible gear motor 584 mounted on the outer rear region of the left end frame base 78 and including an output shaft 586 connected by means of a coupling 588 to an elongated drive shaft 590. The drive shaft 590 is journalled for rotation in bearing assemblies 592 and 594 supported by the right and left end frame bases 76 and 78. The central portion of the drive shaft 590 is rotationally supported by means of a support bracket 596 attached to the channel brace 140 located at the rear of the washer 40.

Mounted near the opposite ends of the drive shaft 590 and adjacent the inner walls of the end frame bases 76 and 78 are a pair of sprockets 598 for driving a pair of drive chains 600. The chains 600 are also meshed with idler sprockets 602 carried by pivotally mounted brackets 604 (FIG. 23) disposed near the front of the washer 40. Each chain 600 is trained over a chain support bar 606 serving to constrain the upper leg of the path of movement of the chain to a horizontal straight line. Chain tension is maintained by adjustment of the brackets 604 by means of adjustment screws 608 (FIG. 23).

Slide assembly 578 includes a channel member 610 extending substantially across the space between the right and left end frame bases 76 and 78. The outermost portions of the channel member 610 are supported by plates 612 (FIG. 24) and the plates are each fastened to a link of the corresponding chain 600 to the end that rotation of the drive shaft 590 produces reciprocal movement of the channel member 610. Supported for rotational movement on a series of brackets 614 mounted on the top of the channel member 610 is a latch bar 616. In order releasably to interconnect the slide assembly 578 with latch brackets 618 of the carts 86, a series of four latch hooks 620 are attached to spaced locations along the latch bar 616. As appears in FIG. 24, each latch hook is fixed by means of a pin 622 for rotation in response to rotation of the latch bar 616. In addition, each latch hook 620 includes a terminal hook portion 624 adapted to engage the latch bracket 618 of a cart 86.

Also fixed to one end of the latch bar 616 (FIG. 25) is a latch release lever 626 normally extending in an upward direction from the latch bar 616 closely adjacent the inner wall of the end frame base 78. In order to control the interconnection of the slide assembly 678 with the carts 86, the release mechanism 582 is provided. With reference now to FIG. 25 the release mechanism 582 includes a cylinder 628 slidably receiving a piston assembly 630 coupled to a release pin 632. The piston assembly 630 is accessible by means of a removable cover plate 634 attached to the outer wall of the base 78 by screws 636. The piston assembly 630 is moved between its alternate positions by means of the application of pressurized air to the interior of the cylinder 670 by way of a pair of conduits 638 and 640 adapted selectively to be coupled to a supply of pressurized air by a suitable control valve or the like.

When a washing cycle has been completed and when the washing liquids have been removed from the machine by the drain assembly 80 described above, the cart positioning assembly 88 is used in carrying out an unloading operation. The carts 86 are wheeled by the operator into the initial position in front of the machine as illustrated in FIG. 23. Pressurized air is admitted to the conduit 640 to move the release pin 632 from the position shown in broken lines in FIG. 25 to the position shown in full lines in FIG. 25. As a result, the release pin 632 clears the latch bar 616 and the latch hooks 620 all rotate due to the force of gravity in a counter-clockwise direction as viewed in FIG. 23 to bring the hook portions 624 of the hooks 620 into engagement with the latch brackets 618 of the carts 86.

At this time, the reversible gear motor 584 is energized in a direction to pull the carts into unloading position. More specifically, rotation of the drive shaft 590 causes the chains 600 to move thereby to pull the channel member 610 toward the rear of the machine. After a predetermined period of energization of the gear motor 584, the carts 86 reach the unloading position in which they are centered under the casing 44. At this time the motor 584 is de-energized with the carts in unloading position.

After the laundry load has been fully emptied into the carts 86, the reversible motor 584 is energized in the opposite direction for returning the carts 86 to their initial positions. More specifically, rotation of the drive shaft 590 causes movement of the chains 600 in a direction to move the channel member 610 once again toward the front of the machine. Pressure is applied to the conduit 638 in order to move the piston assembly 630 and to extend the release pin 640 to the position shown in broken lines in FIG. 25. When the channel member 610 reaches its forwardmost position, and as shown in full lines in FIG. 23, the release lever 626 engages the pin 632 to tilt the release lever 626, the latch bar 616 and the hooks 620 in a clockwise direction as viewed in FIG. 23. In this position the hook portions 624 clear the handles or latch brackets 618 of the carts 86 and the operator of the machine 40 may manually move the carts 86 away from the machine.

Operation

In carrying out a washing operation with the washer 40, the elements of the washer 40 are initially arranged in the loading position illustrated somewhat diagrammatically in FIG. 7 of the drawings. In this position, the cylinder 42 and the casing 44 are interlocked for simultaneous rotation by means of the clutch or interlock assemblies 56 by virtue of the fact that the pins 272 (FIG. 8) are engaged with bushings 286 of the main gears 154. In this position, the cylinder 42 and the casing 44 are arranged so that the door openings of the cylinder 42 and casing 44 are aligned with one another and are disposed at the top of the machine. The doors 50 and 52 of the casing 44 and cylinder 42 are moved to their open position, and a laundry load is dropped into the machine from any suitable laundry handling apparatus such as the chute 644 illustrated diagrammatically in FIG. 7.

After the machine 40 is fully loaded from the chute 644, the casing 44 and the cylinder 42 are simultaneously rotated through a fraction of a revolution to the operating position illustrated diagrammatically in FIG. 5 of the drawings and also shown in FIGS. 1–4 of the drawings. In this position, the dump valve assemblies 82 are disposed at the bottom of the machine and the deck structure 106 is disposed at the top of the machine. The door openings for the doors 50 and 52 are located in the upper front quadrant where the doors are accessible from the platform 130. Prior to beginning the washing operations, the doors 50 and 52 are moved to their closed positions.

To prepare for beginning a laundry operation, the clutch or interlock assemblies 56 are operated in order to disengage the casing 44 from the cylinder 42 and to engage the casing 44 with the end frames 46 and 48 thereby to hold the casing 44 stationary. More specifically, the actuator 290 is pressurized in order to extend the piston 302 against the toggle levers 304 and 306. As a result, by means of the linkage arrangement including the pull rod 318 extending through the tie rod 122, the two shifting forks 288 are moved to axially shift the cage structures 270 to the positions shown in FIG. 8 wherein pins 272 engage bushings 284 of the bearing housings 192 attached to the inner walls 114 and 108 of the end frames 48 and 46.

The casing 44 remains stationary throughout the washing operations during which the cylinder 42 is rotated and reversed at washing speeds. Connections are established between the end frames 46 and 48 and the casing 44 by means of the releasable connections 62, 66, 70 and 72. More specifically, the mixer section 60 is interconnected with the interior of the casing 44 by means of the washing liquid connection 62 and the supply fluid header 328. Furthermore, the interior of the casing 44 is intercommunicated with the steam inlet fitting 64 and the level detection assembly 68 by means of the steam connection 66 and the detection liquid connection 70. Furthermore, electrical and pressurized air connections are established by operation of electrical and air connection 72.

Once the various interconnections are established between the end frames 46 and 48 and the casing 44, the washing operation is commenced under the control of a suitable program controller 642 which may be of any desired known construction. The controller 642 is programmed in accordance with the condition of the laundry load and the type of washing cycle desired. Typically a washing cycle will include various operations such as a sequence of flush, alkali, suds, bleach, rinse, sour, blue and starch operations during which the washer casing 44 is charged with washing liquids, chemicals and the like through the supply header 58 and mixer section 60. During the washing operations, the cylinder is alternatively rotated at substantial speeds in different directions through the operation of the cylinder drive assemblies 54 powered by the balanced drive motors 200. Supplemental heating of the liquids within the casing 44 may be accomplished by the introduction of steam. The level of liquids within the casing 44 is detected and/or controlled by means of the level detection assembly 68. The electrical and air connection 72 serves to interconnect suitable control equipment with electrical sensing devices such as temperature sensing devices located on the casing. Furthermore, pressurized air supplied through the connection 72 my be used to maintain the conventional dump valve assembly 82 closed during washing operations when it is desired to retain liquid in the casing 44.

At the beginning of a washing operation, the drain assembly 80 is positioned in order to permit the discharge of washing liquids through the dump valve assemblies 82 to the rearwardly disposed floor gutter 84. More specifically, the pneumatic cylinder 560 is pressurized to pivot the chutes 532 and 534 from their inactive position best seen in FIGS. 2 and 4 to the operating position best seen in FIGS. 20 and 21 wherein the inlet openings 546 are disposed directly beneath the dump valve assemblies 82 and the downspout portions 550 are disposed directly over the floor gutter 84. Throughout the washing operation, fluids discharged from the downspout assembly 82 are transported by the chutes 532 and 534 to the gutter 84.

Upon the completion of the final operation of the washing cycle, the cylinder 42 is returned to the position illustrated in FIG. 5 wherein the cylinder doors 52 are aligned with the casing doors 50. The interlock or clutch assembly 56 is operated once again to fix the casing to the cylinder 42 and to release the casing 44 from the end frames 46 and 48. In addition, the releasable connections 62, 66, 70 and 72 are each released in order to free the casing 44 for rotation during the unloading operation.

After the drain assembly 80 has been returned to its inactive or standby condition wherein the chutes 532 and 534 are located to the rear of the machine, the cart positioning assembly 88 is used to position wheeled carts 86 beneath the machine. At this time the doors 50 and 52 of the casing 44 and cylinder 42 may be opened and the casing and cylinder are simultaneously rotated to the position illustrated in FIG. 6 wherein the door openings are disposed directly above the wheeled carts 86. To assure complete unloading, the interlocked casing 44 and cylinder 42 are rotated back and forth through an arc of 180° or so in order to assure dislodging of all of the laundry from the interior of the cylinder 42.

After complete unloading, the cart positioning assembly 88 is operated to return the loaded wheeled carts 86 to the front of the machine, at which time the release mechanism 582 operates to release the carts 86 so that they may be removed by the operator. In order to prepare the machine for the next operation, the interlocked casing 44 and cylinder 42 are rotated once again to the loading position shown in FIG. 7 and another cycle commences.

Although the present invention has been described in connection with the details of the illustrated embodiment, it should be understood that such details are not intended to limit the invention which is defined in the following claims.

What is claimed and desired to be secured by Letters Patent of the United States is:

1. Laundry apparatus comprising in combination:
   an inner cylinder including a pair of cylinder end walls and a cylindrical side wall extending between said end walls;
   an outer casing spaced from and enclosing said cylinder and including a pair of casing end walls and a cylindrical side wall extending between said end walls;
   first and second end frames disposed on either side of said outer casing;
   a pair of trunnion means extending axially outwardly from said cylinder end walls and through said casing end walls and supported for rotation on said end frames;
   said casing end walls being supported for rotation on said trunnion means;
   and first and second drive motors mounted respectively on said first and second end frames, each said drive motor being drivingly coupled to the corresponding trunnion means for simultaneously applying rotational driving forces to opposite ends of said inner cylinder.

2. The laundry apparatus of claim 1 comprising means for selectively interlocking said outer casing to at least one of end frames for holding said outer casing stationary during rotation of said inner cylinder, and alternatively for interlocking said outer casing with said inner cylinder for rotation with said inner cylinder.

3. The laundry apparatus of claim 2, said interlocking means including first and second interlock assemblies associated respectively with said first and second end frames for carrying out said interlocking operations simultaneously on both ends of said outer casing.

4. The laundry apparatus of claim 3, main gears supported on each of said trunnion means, said interlock assemblies serving to interlock said casing end walls with said main gears and alternatively to interlock said casing end walls and said end frames.

5. Laundry apparatus comprising a pair of supports, a laundry enclosure mounted for rotation between the supports, and at least one drive system carried by at least one of said supports for rotating said enclosure, said drive system including a first rotatably mounted shaft drivingly coupled to said enclosure, a drive motor mounted on said support, a second rotatably mounted shaft drivingly coupled to said motor, and gear drive means coupled between said first and second shafts, said gear drive means including resilient drive transfer means for absorbing shocks transferred between said drive motor and said enclosure.

6. Laundry apparatus as claimed in claim 5 comprising a pair of said drive systems, one associated with each of said supports.

7. Laundry apparatus as claimed in claim 5, said first and second shafts being disposed at 90° with respect to one another.

8. Laundry apparatus as claimed in claim 5, said resilient drive transfer means comprising a pair of drive elements having interfacing and slidably related surfaces, and resilient means drivingly coupled between said drive elements.

9. Laundry apparatus as claimed in claim 8, one of said drive elements having a plurality of peripherally spaced recesses, said resilient means comprising a plurality of elastomeric bushings disposed in said recesses, and a plurality of drive projection means fixed to the other of said drive elements and extending through said bushings.

10. Laundry apparatus as claimed in claim 9, one of said drive elements being fixed to said first shaft, a driven gear fixed to the other of said drive elements, and a drive gear fixed to said second shaft and engaging said driven gear.

11. Laundry apparatus as claimed in claim 10, said driven gear comprising a substantially circular ring gear surrounding said first shaft.

12. Laundry apparatus as claimed in claim 11 comprising a pair of said drive systems, one associated with each of said supports.

13. Laundry apparatus as claimed in claim 11, said first and second shafts being disposed at 90° with respect to one another.

14. A laundry machine comprising an inner cylinder, an outer casing surrounding said inner cylinder, a pair of end frames supporting both said cylinder and said casing for rotation about a common axis, and at least one interlock assembly associated with one of said end frames for controlling the rotation of said casing, said interlock assembly including a first element fixed to said end frame and located in a first plane substantially normal to and surrounding said rotational axis, a second element mounted for rotation with said cylinder and located in a second plane substantially parallel to and spaced from said first plane, and a third element sandwiched between said first and second elements and rotationally fixed to said outer casing, said third element being axially shiftable and selectively engageable alternatively with said first and second elements.

15. A laundry machine as claimed in claim 14, said inner cylinder including trunnion shafts extending outwardly and journalled for rotation in said end frames, said second element being mounted on one of said trunnion shafts.

16. A laundry machine as claimed in claim 15, said second element comprising a main gear, and a driving gear engageable with said main gear for rotating said inner casing.

17. A laundry machine as claimed in claim 16, said end frame including spaced and outer walls, said main gear being disposed in the region between said walls, said first element being mounted on one of said walls.

18. A laundry machine as claimed in claim 14, said first and second elements including a plurality of recesses arranged substantially in a circle surrounding said rotational axis, and said third element including a plurality of pin means alternatively engageable with the recesses of said first and second elements.

19. A laundry machine as claimed in claim 18, a plate having a plurality of holes slidably receiving said pins, said plate being fixed with respect to said casing, a cage structure surrounding said plate and carrying said pins, and means for selectively shifting said cage structure in an axial direction.

20. A laundry machine as claimed in claim 19, including two said interlock assemblies, one associated with each said end frame.

21. A laundry machine as claimed in claim 20, at least one tie rod connected between said end frames radially outward of said outer casing, and linkage means for operating said interlock assemblies including a pull rod slidable within said tie rod.

22. Laundry apparatus comprising a pair of spaced end frames each having inner and outer walls defining a compartment, at least one tie rod extending between said end frames, laundry enclosure means mounted for rotation between said end frames, means including a pair of movable elements one disposed within each end frame compartment for controlling the rotation of said enclosure means, and a linkage means for simultaneously moving both said movable elements and including a slidable rod disposed within said tie rod.

23. The laundry apparatus of claim 22, further comprising actuating means mounted within one of said end frames for operating said linkage means.

References Cited

UNITED STATES PATENTS

| | | | |
|---|---|---|---|
| 1,925,662 | 9/1933 | Hume | 68—140 |
| 2,070,192 | 2/1937 | Zarafu | 68—140 |
| 3,253,434 | 5/1966 | Ellis | 68—140 |
| 3,321,941 | 5/1967 | Ellis | 68—140 X |

WILLIAM I. PRICE, Primary Examiner

U.S. Cl. X.R.

68—210